US006350543B2

(12) United States Patent
Yang et al.

(10) Patent No.: US 6,350,543 B2
(45) Date of Patent: Feb. 26, 2002

(54) MANGANESE-RICH QUATERNARY METAL OXIDE MATERIALS AS CATHODES FOR LITHIUM-ION AND LITHIUM-ION POLYMER BATTERIES

(75) Inventors: Kaiyuan Yang, Roswell; Kevin P. McGrath, Alpharetta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/742,738

(22) Filed: Dec. 21, 2000

Related U.S. Application Data
(60) Provisional application No. 60/173,911, filed on Dec. 29, 1999.

(51) Int. Cl.[7] .................................................. H01M 4/50
(52) U.S. Cl. ..................................... 429/224; 429/231.1
(58) Field of Search .............................. 429/224, 231.1; 423/599, 600

(56) References Cited

U.S. PATENT DOCUMENTS

| 4,251,600 A | 2/1981 | Sim et al. .................. 429/12 |
| 4,259,415 A | 3/1981 | Tamura et al. .............. 429/90 |
| 4,567,031 A | 1/1986 | Riley ......................... 423/593 |
| 4,980,080 A | 12/1990 | Lecerf et al. ............ 252/182.1 |
| 5,114,810 A | 5/1992 | Frysz et al. ................. 429/194 |
| 5,169,736 A | 12/1992 | Bittihn et al. ............... 429/194 |
| 5,180,574 A | 1/1993 | Von Sacken ............... 423/594 |
| 5,264,201 A | 11/1993 | Dahn et al. ................ 423/594 |
| 5,344,728 A | 9/1994 | Ovshinsky et al. ......... 429/223 |
| 5,370,948 A | 12/1994 | Hasegawa et al. .......... 429/223 |
| 5,376,475 A | 12/1994 | Ovshinsky et al. ......... 429/101 |
| 5,429,890 A | 7/1995 | Pynenburg et al. ......... 429/192 |
| 5,437,945 A | 8/1995 | Omaru et al. ............... 429/197 |
| 5,474,752 A | 12/1995 | Yamamoto .................. 423/596 |
| 5,490,320 A | 2/1996 | Hasegawa et al. ......... 29/623.1 |
| 5,514,496 A | 5/1996 | Mishima et al. ............ 429/218 |
| 5,518,842 A | 5/1996 | Fey et al. .................... 429/218 |
| 5,571,634 A | 11/1996 | Gozdz et al. ................ 429/192 |

(List continued on next page.)

FOREIGN PATENT DOCUMENTS

| EP | 0 849 817 A2 | 6/1997 | ............ H01M/4/52 |
| EP | 0 872 450 A1 * | 4/1998 | ............ C01G/53/00 |
| EP | 0 872 450 A1 | 10/1998 | ............ C01G/53/00 |
| JP | 10 199525 | 7/1998 | ............ H01M/4/48 |
| JP | 11 307094 | 11/1999 | ............ H01M/4/58 |
| WO | WO 98/16960 | 4/1998 | ............ H01M/6/00 |

OTHER PUBLICATIONS

Abstract of Japanese Patent Application No. 11307094 published Nov. 5, 1999 entitled Lithium Secondary Battery Positive Electrode Active Material and Lithium Secondary Battery.

Abstract of Japanese Patent Application No. 10199525 published Jul. 31, 1998 entitled Nonaqueous Electrolyte Secondary Battery.

Publication No. XP–000994589 by Electrochemical Society Proceedings, vol. 99–24 by Rodriguez, et al entitled In–situ X–ray Diffraction of Layered LiCoO2–type Cathode Materials.

(List continued on next page.)

Primary Examiner—Carol Chaney
(74) Attorney, Agent, or Firm—Nelson Mullins Riley & Scarborough

(57) ABSTRACT

Positive electrode-active materials for use in lithium-ion and lithium-ion polymer batteries contain quaternary composite oxides of manganese, nickel, cobalt and aluminum where one of the four is present at levels of over 70 mol percent. The composite oxides can be lithiated to form positive electrode-active materials that are stable over at least ten charge/discharge cycles at voltage levels over 4.8 volts, and have capacities of over 200 mAh/g. Methods for producing the materials and electrochemical cells and batteries that include the materials are also provided.

34 Claims, 9 Drawing Sheets

U.S. PATENT DOCUMENTS

| | | | |
|---|---|---|---|
| 5,582,935 A | 12/1996 | Dasgupta et al. | 429/218.1 |
| 5,591,548 A | 1/1997 | Mao | 429/218 |
| 5,599,642 A | 2/1997 | Toshiro et al. | 429/194 |
| 5,609,975 A * | 3/1997 | Hasegawa et al. | 429/217 |
| 5,626,635 A | 5/1997 | Yamaura et al. | 29/623.5 |
| 5,629,110 A | 5/1997 | Kobayashi et al. | 429/223 |
| 5,630,993 A | 5/1997 | Amatucci et al. | 423/594 |
| 5,631,104 A | 5/1997 | Zhong et al. | 429/194 |
| 5,648,057 A | 7/1997 | Ueda et al. | 423/594 |
| 5,677,086 A | 10/1997 | Satoh et al. | 429/223 |
| 5,677,087 A | 10/1997 | Amine et al. | 429/224 |
| 5,681,673 A | 10/1997 | Hattori et al. | 429/235 |
| 5,718,989 A | 2/1998 | Aoki et al. | 429/218 |
| 5,742,070 A | 4/1998 | Hayashi et al. | 252/182.1 |
| 5,744,266 A | 4/1998 | Nunome et al. | 429/224 |
| 5,750,288 A | 5/1998 | Xie et al. | 429/229 |
| RE35,818 E | 6/1998 | Tahara et al. | 429/218 |
| 5,759,717 A | 6/1998 | Amine et al. | 429/218 |
| 5,759,719 A | 6/1998 | Mao | 429/223 |
| 5,773,168 A | 6/1998 | Kubo et al. | 429/223 |
| 5,783,332 A | 7/1998 | Amine et al. | 429/218 |
| 5,783,334 A | 7/1998 | Yasuda | 429/223 |
| 5,783,335 A | 7/1998 | Mayer | 429/223 |
| 5,789,107 A | 8/1998 | Okada et al. | 429/192 |
| 5,792,574 A | 8/1998 | Mitate et al. | 429/194 |
| 5,795,558 A | 8/1998 | Aoki et al. | 423/594 |
| 5,804,335 A | 9/1998 | Kamauchi et al. | 429/218 |
| 5,817,436 A | 10/1998 | Nishijima et al. | 429/194 |
| 5,824,284 A | 10/1998 | Satoh et al. | 423/594 |
| 5,895,731 A | 4/1999 | Clingempeel | 429/162 |
| 5,911,920 A | 6/1999 | Hasezaki et al. | 252/518.1 |
| 5,914,094 A | 6/1999 | Sun et al. | 423/594 |
| 5,985,488 A | 11/1999 | Mitate et al. | 429/223 |
| 5,993,998 A | 11/1999 | Yasuda | 429/231.95 |
| 6,007,947 A | 12/1999 | Mayer | 429/231.1 |
| 6,024,773 A | 2/2000 | Inuzuka et al. | 29/623.4 |
| 6,103,422 A | 8/2000 | Kanai | 429/224 |

OTHER PUBLICATIONS

PCT International Search Report for International Application No. PCT/US 00/35418 dated May 23, 2001.

Abstract No. JP411025984A dated Jan. 29, 1999 entitled "Positive active material for Lithuim ion battery and its manufacture".

Abstract No. JP409293506A dated Nov. 11, 1997 entitled "Manufacture of positive pole active material for nonaqueous electrolyte secondary battery".

Abstract No. 125:280753 dated 1997 entitled "Manufacture and use of lithium intercalation compounds, electrodes containing the compounds, and batteries containing the electrodes" from the American Chemical Society Publication.

Abstract No. 125:253070 dated 1997 entitled "Cathodes and secondary lithium batteries using the cathodes" from the American Chemical Society Publication.

Abstract No. 125:252799 dated 1997 entitled "Electric conductivity and conduction of nickel–doped lithium cobalt oxides" from the American Chemical Society Publication.

Abstract No. 125:200863 dated 1997 entitled "Cathodes for secondary lithium batteries and secondary lithium batteries using them" from the American Chemical Society.

Abstract No. 125:183936 dated 1997 entitled "Thermal decomposition of lithium manganese nickel oxides" from the American Chemical Society Publication.

Abstract No. 125:173374 dated 1997 entitled Manufacture of lithium nickel oxide cathodes for secondary lithium batteries from the American Chemical Society Publication.

Abstract No. 125:156826 dated 1997 entitled "Lithium doping of cobalt–nickel spinel oxides at low temperatures" from the American Chemical Society Publication.

Abstract No. 125:119524 dated 1997 entitled "Manufacturing processes of positive active materials for lithium secondary batteries and the same lithium secondary batteries" from the American Chemical Society Publication.

Abstract No. 125:119497 dated 1997entitled "Secondary nonaqueous–electrolyte lithium batteries with improved cathodes" from the American Chemical Society Publication.

Abstract No. 125:119496 dated 1997 entitled "Cathode active mass, their manufacture, and nonaqueous–electrolyte secondary batteries using them" from the American Chemical Society Publication.

Abstract No. 125:103328 dated 1997 entitled "Synthesis of electrochemically active LiCoO2 and LiNi)2 at 100° C." from the American Chemical Society Publication.

Abstract No. 125:38098 dated 1997 entitled "Secondary lithium batteries with improved cathodes" from the American Chemical Society Publication.

Abstract No. 125:15274 dated 1997 entitled "Lithium batteries using cathodes containing amorphous oxides and manufacture of the cathodes" from the American Chemical Society Publication.

Abstract No. 124:321550 dated 1997 entitled "Lithium containing transition metal mixed oxides and their manufacture and use" from the American Chemical Society Publication.

Abstract No. 124:294521 dated 1997 entitled "Sintered cathode substrates for secondary alkaline batteries and their manufacture" from the American Chemical Society Publication.

Abstract No. 124:265683 dated 1997 entitled "Manufacture of cathode active material for secondary nonaqueous–electrolyte battery" from the American Chemical Society Publication.

Abstract No. 124:265653 dated 1997 entitled "Manufacture of cathodes for secondary nonaqueous–electrolyte batteries" from the American Chemical Society Publication.

Abstract No. 124:237176 dated 1997 entitled "Cathode material for lithium ion secondary batteries" from the American Chemical Society Publication.

Abstract No. 124:69685 dated 1997 entitled "Synthesis and characterization of LiAl¼Ni¾O2 (R3m) for lithium–ion (shuttlecock) batteries" from the American Chemical Society Publication.

Abstract No. 123:345754 dated 1997 entitled "Manufacture of cathode active mass for secondary nonaqueous lithium batteries" from the American Chemical Society Publication.

Abstract No. 123:204401 dated 1997 entitled "Secondary nonaqueous lithium batteries with improved cathodes" from the American Chemical Society Publication.

Abstract No. 123:88415 dated 1997 entitled "Manufacture of active cathode material for secondary lithium battery" from the American Chemical Society Publication.

Abstract No. 123:37133 dated 1997 entitled "Crystal structure and electrochemical properties of LiAlyNi1–yO2 solid solution" from the American Chemical Society Publication.

Abstract No. 123:13693 dated 1997 entitled "Electrochemical characteristics of LiNiO2 as a positive material for secondary batteries" from the American Chemical Society Publication.

Abstract No. 123:13654 dated 1997 entitled "Synthesis and properties of LiNiO2 as cathode material for secondary batteries" from the American Chemical Society Publication.

Abstract No. 122:318629 dated 1997 entitled "Performance of the LiMnxNi1–xO2 electrode" from the American Chemical Society Publication.

Abstract No. 122:165502 dated 1997 entitled "Nonaqueous batteries with lithium intercalating double oxide cathodes" from the American Chemical Society Publication.

Abstract No. 121:283581 dated 1997 entitled "Secondary nonaqueous batteries with lithium manganese nickel oxide cathodes" from the American Chemical Society Publication.

Abstract No. 121:259658 dated 1997 entitled "Manufacture of lithium nickel oxide, lithium cobalt oxide, and lithium manganese oxide for cathodes of lithium secondary batteries" from the American Chemical Society Publication.

Abstract No. 121:234711 dated 1997 entitled "Lithium battery" from the American Chemical Society Publication.

Abstract No. 121:183490 dated 1997 entitled "Thermal stability of LixCoO2, LixNiO2 and $\lambda$–MnO2 and consequences for the safety of Li–ion cells" from the American Chemical Society Publication.

Abstract No. 121:160752 dated 1997 entitled "Solid–state redox reactions of LiNi½Co½O2 (R3m) for 4 volt secondary lithium cells" from the American Chemical Society Publication.

Abstract No. 121:113318 dated 1997 entitled "Nonaqueous electrolyte lithium secondary battery" from the American Chemical Society Publication.

Abstract No. 120:249226 dated 1997 entitled "Preparation of layered LiNiO2 by alcoholate method and its behavior as a cathode in lithium secondary battery" from the American Chemical Society Publication.

Abstract No. 120:195993 dated 1997 entitled "Lithium batteries having improved cathodes" from the American Chemical Society Publication.

Abstract No. 120:111715 dated 1997 entitled "Lithium batteries with improve cathodes" from the American Chemical Society Publication.

Abstract No. 120:111711 dated 1997 entitled "Lithium nickel oxide cathode for secondary lithium battery, manufacture of this cathode, and secondary nonaqueous–electrolyte lithium battery using this cathode" from the American Chemical Society Publication.

Abstract No. 120:81457 dated 1997 entitled "Characterization of LT–LixCo1–yNiyO2 electrodes for rechargeable lithium cells" from the American Chemical Society Publication.

Abstract No. 120:58507 dated 1997 entitled "Cathode active material for secondary nonaqueous–electrolyte lithium batteries, and its manufacture" from the American Chemical Society Publication.

Abstract No. 119:163978 dated 1997 entitled "Preparation of lithium nickel oxide (niNiO2) by alcoholate method for the cathode–active material of lithium secondary battery" from the American Chemical Society Publication.

Abstract No. 119:163970 dated 1997 entitled "Lithium/lithium nickel oxide (LixNiO2) and lithium/lithium cobalt oxide (LixCoO2) rechargeable systems; comparative study and performance of practical cells" from the American Chemical Society Publication.

Abstract No. 118:201116 dated 1997 entitled "Structure and electrochemistry of lithium manganese nickel oxide (LixMnyNi1–yO2)" from the American Chemical Society Publication.

Abstract No. 118:9286 dated 1997 entitled "Lithium–cobalt–nickel–oxide cathode materials prepared at 400° C. for rechargeable lithium batteries" from the American Chemical Society Publication.

Abstract No. 115:283628 dated 1997 entitled "Layered lithium–transition metal oxides" from the American Chemical Society Publication.

Abstract No. 114:31719 dated 1997 entitled "Preliminary results on synthesis and characterization of LiCo1–xNixO2 ($0 \leq x \leq 0.5$) for 4–volts class of rechargeable lithium cells" from the American Chemical Society Publication.

Abstract No. 114:85372 dated 1997 entitled "Cathodes for secondary nonaqueous–electrolyte batteries" from the American Chemical Society Publication.

Abstract No. 113:140726 dated 1997 entitled "The addition of aluminum oxide to the nickel anodes of molten a carbonate fuel cell" from the American Chemical Society Publication.

Abstract No. 112:182915 dated 1997 entitled "Secondary lithium battery" from the American Chemical Society Publication.

Abstract No. 112:182901 dated 1997 entitled "Manufacture of cathode–active mass for secondary lithium battery" from the American Chemical Society Publication.

Abstract No. 111:118194 dated 1997 entitled "Secondary nonaqueous batteries with oxide electrodes" from the American Chemical Society Publication.

Abstract No. 110:103816 dated 1997 entitled "The effect of lithium hydroxide on the nickel hydroxide electrode" from the American Chemical Society Publication.

Abstract No. 109:113519 dated 1997 entitled "Organic–electrolyte batteries with lithium–containing nickel cobalt oxide cathodes" from the American Chemical Society Publication.

Abstract No. 109:96029 dated 1997 entitled "Lightweight secondary batteries" from the American Chemical Society Publication.

Abstract No. 108:170849 dated 1997 entitled "Manufacture of cathode–active material for nonaqueous batteries" from the American Chemical Society Publication.

Abstract No. EP 00702421A1 dated Mar. 20, 1996 entitled "Lithiated nickel dioxide and secondary cells prepared therefrom".

Abstract No. WO 09534919A1 dated Dec. 21, 1995 entitled "A Cathode Material for Lithium Secondary Batteries and a Process and a Precursor material for the Production thereof".

Abstract No. 07–320751 dated Dec. 8, 1995 entitled "Solid Electrolyte Battery".

Abstract EP 000633223 A1 dated Jan. 1995 entitled "Nickel hydroxide powder contg. trivalent manganese—for secondary battery electrode with improved capacity and cycle stability (Ger)" from Derwent Information Limited.

Abstract No. WO 94/22767 dated Oct. 13, 1994 entitled "Method of Production of LiM3+O2 or LiMn2O4 and Lini3+O2 as positive pole material of secondary cell".

Abstract No. WO 09421560A1 dated Sep. 29, 1994 entitled "Lithiated Manganese Oxide".

Abstract No. GB 02276156A dated Sep. 21, 1994 entitled "Lithiated manganese oxide".

Abstract No. JP 406 115940 A dated Apr. 1994 entitled "Method for forming thin film manganese nickel–based oxide".

Abstract No. JP 405270838 A dated Oct. 1993 entitled "Formation of Manganese–Cobalt oxide thin film".

Abstract No. JP 405155628 A dated Jun. 1993 entitled "Formation of manganese cobalt oxide thin film".

Abstract No. EP 00468942A2 dated Jan. 29, 1992 entitled "Lithiated nickel dioxide and secondary cells prepared therefrom".

Abstract No. JP403228826A dated Oct. 9, 1991 entitled "Production of Lithium containing vandium oxide".

Abstract No. JA 0145429 dated Jun. 1990 entitled Manganese oxide for dry cells—is principally gamma manganese oxide and contains aluminum in specified cut range from Derwent Publications.

Abstract No. JP 363210028 A dated Aug. 1988 entitled "Synthesis of lithium manganese oxide solid soln.—by heating manganese and lithium oxide(s) or their salts which decompose to oxide(s), and transition metal oxide" from Derwent Publications, LTD.

Abstract No. 58–123660 (A) entitled "Manufacture of Nickel Electrode". Jul. 1983.

Abstract No. JE 0004335 dated Jan. 1979 entitled Nickel active material prepn. for alkali electrolyte cell.

Abstract No, 42646X/23 dated Apr. 19, 1976 entitled Alkaline primary battery of higher nickel hydroxide cathode additionally containing lithium, rubidium or caesium.

Publication from Journal of The Electrochemical Society 1999 edition entitled "$LiNi_xCu_{0.5-x}Mn_{1.5}O_4$ Spinel Electrodes, Superior High–Potential Cathode Materials for Li Batteries" by Ein–Eli, et al. no month.

Publication from Advanced Battery Technology, Nov. 1998 edition entitled "Technical Article—Solid Solutions: New Cathodes for Next Generation Lithium–Ion Batteries" by David Huang no month.

Publication from ElectroChemical and Solid–State Letters 1998 edition entitled "Structural Fatigue in Spinel Electrodes in High Voltage (4V) $Li/Li_xMn_2O_4$ Cells" by Thackeray, et al no month.

Publication from ElectroChemical and Solid–State Letters 1998 edition entitled "Novel $LiNi_{1-x}Ti_{x/2}Mg_{x/2}O_2$ Compounds as Cathode Materials for Safer Lithium–Ion Batteries" by Gao, et al no month.

Publication from Electrochimica Acta, vol. 38, No. 9, pp 1221–1231, 1993 edition entitled "The $Li_{1+x}Mn_2O_4$/C Rocking–Chair System: A Review" by Tarascon no month.

Publication excerpt from Advanced Battery System, Chapter 36, entitled Rechargeable Lithium Batteries (Ambient Temperature) by Hossain. no date available.

Publication excerpt from Handbook of Batteries, Second Edition, p. 3.4 by David Linden. no date available.

* cited by examiner

MANGANESE-RICH QUATERNARY METAL OXIDE MATERIALS AS CATHODES FOR LITHIUM-ION AND LITHIUM-ION POLYMER BATTERIES

CROSS REFERENCE TO RELATED PATENTS AND PATENT APPLICATIONS

The subject matter of the present invention is related to the co-pending and commonly assigned United States patent application titled "Manganese-Rich Quaternary Metal Oxide Materials As Cathodes For Lithium-ion And Lithium-ion Polymer Batteries", which was filed on the same date as the present application. The present application claims the benefit of priority from U.S. Provisional Patent Application Ser. No. 60/173,911, filed on Dec. 29, 1999.

BACKGROUND OF THE INVENTION

(1) Field of the Invention

The present invention relates to rechargeable power sources for portable electronic devices such as camcorders, cell phones, laptop computers and toys, and more particularly to positive electrode-active materials for lithium, lithium-ion and lithium-ion polymer batteries and methods of making and using such materials.

(2) Description of the Related Art

Rapid technological developments in the electronics and computer industry have created a large consumer market for a variety of batteries. Today, batteries are used to power almost every portable electronic device, such as cell phones, laptop computers, camcorders, portable radios, cameras and toys. With the continuing miniaturization in the electronic industry and in portable electronic devices, the demand for lightweight, compact, and yet high-energy density batteries has been steadily increasing. In addition, a need for more efficient utilization of the available energy resources as well as air-quality-control has generated an enormous interest in the development of advanced high energy density batteries for electric powered vehicles. Furthermore, cost effectiveness, rechargeability, and better safety characteristics have been other factors driving the battery market.

Lithium-ion and lithium-ion polymer batteries represent a new generation of lightweight, compact, and yet high-energy power sources. This is particularly true for lithium-ion polymer cells since they can be made very thin, and with great shape flexibility. Lithium-based batteries are attractive for energy storage because of lithium's high specific capacity (3800 Ah/kg) and low electronegativity (0.97). These properties lead to energy cells ("cells") with high energy density and high voltage. The materials that are used to produce lithium-based batteries are also less toxic than the components of nickel cadmium or lead acid cells, and their disposal poses fewer environmental problems.

The commercial and military applications of lithium-based batteries date back to the 1960's and 1970's. Primary lithium batteries (single use, lithium metal as anode) were commercialized in the 1970's. These were followed by the development of rechargeable secondary cells that also used lithium metal as anodes in the early 1980's.

Typically, a lithium cell has been made up of a lithium metal negative electrode ("anode"), a positive electrode ("cathode"), such as manganese oxide ($Mn_2O_4$), and some type of an electrolyte that serves as an ionic path for lithium ion between two electrodes. During discharge, lithium ions from the metallic anode pass through the electrolyte to the electrochemical materials of the cathode whereupon they release electrical energy to an external circuit.

Since their commercialization, primary lithium cells (that is, cells which are used as a power source for one application and then are discarded) have been widely used in both commercial and military applications, while most rechargeable secondary cells have been struggling on the market. Difficulties associated with secondary cells stem from reactions of lithium metal with electrolytes and the changes in the lithium surface that occur after repetitive charge-discharge cycling. Furthermore, the high reactivity of the lithium metal presents a fire and explosive hazard, which becomes a serious concern when use is considered in larger cells.

In addressing the issues associated with highly reactive and irreversible metallic lithium anodes, a more advanced and inherently safer approach, the so-called rocking chair or lithium-ion cell, was adopted in the late 1970's and early 1980's. In this approach, a lithium metal negative electrode is replaced by a lithium intercalation material or compound, such as lithiated carbon or lithiated metal oxides, while another lithium intercalation material is used for the positive electrode, or cathode. The operation of such a system involves the shuttling of lithium ions back and forth between the two intercalation compounds during charge/discharge cycles. The output voltage of these types of rocking chair cells is determined by the difference between the electrochemical potential of lithium within the two lithium intercalating electrodes.

An insertion compound is a host into/from which a guest species may be topotactically and reversibly inserted/extracted over a finite range of solid solution. Once such example would be graphite, which is known to reversibly intercalate lithium-ions and has been used as an anode material in lithium-ion batteries. Further examples of such compounds are lithium metal oxides, where the metal can be selected from a wide range of metals.

Research and commercial development concerning rocking chair batteries has been extensive since the adoption of that product. The first commercial lithium-ion cell based on the carbon anode and $LiCoO_2$ was marketed by Sony Corporation in about 1990.

Positive electrodes (cathodes) are the most critical component in the lithium-ion and lithium-ion polymer batteries, as they determine the battery performance attributes such as operating voltage, energy density, and cycle life. For the purposes of this specification, the term "operating voltage" shall mean that working voltage produced when the battery is fully operational. For the purposes of this specification, the term "energy density" shall mean the energy produced per unit volume and or weight. For the purposes of this specification, the term "cycle life" shall mean the number of cycles that the battery can experience in its effective lifetime. In this regard, lithium insertion compounds as cathode materials for lithium-ion batteries have been extensively investigated in the past two decades. The electrochemical potential range of lithium insertion compounds (with respect to the Li metal) for a wide variety of compounds has been obtained and documented such as in Manthiram et al, *JOM*, 49:43 (1997).

Among the insertion compounds that have been evaluated, $LiCoO_2$, $LiNiO_2$, and $LiMn_2O_4$ have been found to be most attractive. The theoretical capacities of both $LiNiO_2$ and $LiCoO_2$ are about 275 Ah/kg. However (from a practical matter), only a fraction of the theoretical capacity can be reached. Compared to $LiNiO_2$ and $LiCoO_2$, $LiMn_2O_4$ gives a lower theoretical capacity of 148 Ah/kg and typically no more than 120 Ah/kg can be obtained. At present, most commercial lithium-ion batteries use $LiCoO_2$ as the cathode material, whereas $LiNiO_2$ and $LiMn_2O_4$ are much less common.

The preference of $LiCoO_2$ in commercial cells stems from its better cycleability over $LiNiO_2$ and $LiMn_2O_4$, despite the fact that $LiCoO_2$ is the most expensive of the three compounds. The reversible capacity of $LiNiO_2$ is limited by irreversible phase transition on first delithiation, in which more than 10% of initial capacity can be lost. In addition, the thermal stability of $LiNiO_2$ is not good at its delithiated state, which can lead to safety concerns because of gaseous oxygen release. $LiMn_2O_4$, on the other hand, experiences problems due to Mn dissolution from electrodes into electrolyte solution at high discharge rate, Jahn-Teller effects at the end of the deep discharge, and parasitic phase formation during the charge/discharge cycles. For further information in this regard see Thackeray, M., et al., *Electrochemical and Solid State Letters*, 1:7–9 (1998).

Despite the tremendous effort employed in improving the performance of each type of insertion compound by different preparation procedures, the charge/discharge properties of these compounds are still not sufficient to satisfy commercial requirements. At present, at least, a single metal-based cathode material cannot meet all of the performance requirements of lithium-ion batteries. Accordingly, the recent trend in battery development has been shifted to multi-metallic insertion compounds that can take advantage of the attributes of each metal component. See for example: Huang D. *Advanced Battery Technology*, p. 21, November (1998).

For instance, in Cedar et al., *Nature*, 392:694 (1998), it has been shown that part of the transition metal in a cathode material could be replaced by other elements such as non-transition-metal ions, while still retaining electrochemical Li-activity at higher voltage. The article suggested that oxygen atoms are playing an important role in promoting the electron exchange and the cell voltage correlates with increased oxygen participation. Cedar and coworkers apparently observed improved cell voltage and better cycleability in Al-adopted bimetallic $Li_xAl_yCo_{1-y}O_2$ and $Li_xAl_yMn_{1-y}O_2$ systems. See, also, Cedar et al., *Computational Materials Science*, 161:8 (1997), and Jang et al., *Electrochemical and Solid State Letters*, 13:1 (1998).

Furthermore, U.S. Pat. No. 5,370,948 to Hasegawa et al., U.S. Pat. No. 5,264,201, to Dahn et al., U.S. Pat. No. 5,626,635 to Yamamura et al., as well as academic publications by Zhong et al., in *J. Electrochem. Soc.*, 144: 205 (1997); Amine et al., in *J. Power Sources*, 68: 604 (1997), Fey et al. in *J. Electrochem. Soc.*, 141: 2279 (1994); Sigala et al., in *Solid State Ionics*, 81:167 (1995)); and Ein-Eli et al., *J. Electrochem. Soc.*, 145:1238 (1998), describe binary cathode materials. Liu et al., in *J. Electrochem. Soc.*, 879:143 (1996), describe the production of composite oxides of one or two metals by forming a polymeric resin throughout which metal ions are distributed. They show that the resin is homogeneous at an atomic level and can be calcined at temperatures that are lower than normally used to yield composite oxides that have high surface area and unique morphologies.

Ternary and quaternary cathode combinations have also been explored, albeit much less than binary systems. In this regard, U.S. Pat. Nos. 5,783,333 and 5,795,558, to PolyStor Corporation (Dublin, Calif.) and Japan Storage Battery Co., Ltd. (Tokyo, Japan), respectively, as well as academic publications by Ein-Eli et al. in *J. Electrochem. Soc.*, 146:908 (1999) and Gao et al., in *Electrochem. & Solid State Letters* 1:1 17 (1998), describe such systems.

U.S. Pat. Nos. 5,718,989 and 5,795,558 to Aoki et al., describe positive electrode-active materials for a lithium secondary battery and a method of producing them. The cathode materials described include formulations such as $LiNi_{1-x-y-z}Co_xMn_yAl_zO_2$, but cobalt content never exceeds 25 mol percent, manganese content never exceeds 30 mol percent, and aluminum content never exceeds 15 mol percent of the combined Ni, Co, Mn and Al content. These materials appear to be produced by a process which does not start with a homogeneous solution of the four metals that make up the composite oxide. The process, therefore, would not be expected to provide molecular level mixing of all four of the metals before calcination. Moreover, the method appears not to use low covalent Mn (II) salt as the source of manganese, and would, therefore, not be expected to provide efficient oxidation of the mixture at lower temperatures, so as to avoid phase separation of the calcined composite oxide material. Electrodes that are produced by the disclosed process were apparently never tested by charging to over 4.1 volts, too low a voltage level to provide any indication of the performance of such materials at higher voltage levels, i.e., above about 4.6 volts.

U.S. Pat. Nos. 5,783,333 and 6,007,947 to Mayer disclose the formation of ternary material formulated as $Li_xNi_y Co_xM_zO_2$ and suggest that quaternary combinations are possible.

Despite these advances, there is still a need for a new generation of cathode-active compounds that can provide high capacity with low cost, good cycleability, and high stability, particularly at voltage levels above about 4.2 volts. There is also a need for methodologies for preparing homogeneously mixed multi-metallic compositions that can effectively combine each metal's performance characteristics. In addition, there is a need to find such cathode-active compounds that minimize the irreversible capacity loss during the first and subsequent delithiation cycles and that have increased mid-point cell voltage. It is to such needs that the present invention is directed.

SUMMARY OF THE INVENTION

Briefly, therefore, the present invention is directed to a novel positive electrode material comprising a composite oxide having the general formula $Li_xMn_yNi_zCo_uAl_wO_n$, where $0<x\leq 2$, $2\leq n\leq 4$, the sum of $y+z+u+w$ is about 1 to 2, z, u and w are each greater than 0, and $0.7\leq y/(y+z+u+w)<1.0$.

The present invention is also directed to a novel electrochemical cell produced by the method described just above.

The present invention is also directed to a novel method of producing a positive electrode active material having the general formula $Li_xMn_yNi_zCo_uAl_wO_n$, comprising the steps: (a) mixing manganese, nickel, cobalt and aluminum, in relative amount so that $0.7\leq y/(y+z+u+w)<1.0$, and z, u, and w are each greater than 0; (b) adding a source of lithium to the mixture; and (c) calcining the mixture of lithium, manganese, cobalt, nickel, and aluminum in the presence of oxygen to form a lithiated composite oxide material having the general formula $Li_x Mn_yNi_zCo_uAl_wO_n$, where $0.7\leq y/(y+z+u+w)<1.0$, and $0<x\leq 2$, and $2\leq n\leq 4$.

The present invention is also directed to a novel electrochemical cell produced by the method described just above.

The present invention is also directed to a novel electrochemical cell comprising a positive electrode, a negative electrode and an electrolyte which electrochemically interconnects the positive electrode and the negative electrode, wherein the positive electrode comprises a composite oxide having the general formula $Li_xMn_yNi_zCo_uAl_wO_n$, wherein $0.7 \leq y/(y+z+u+w)<1.0$, and where $0<x \leq 2$, the sum of $y+z+u+w$ is about 1 to 2, and $2 \leq n \leq 4$.

The present invention is also directed to a novel lithium-ion battery comprising a sealable cell container, a positive electrode, a negative electrode, an electrolyte solution, a separator, a positive electrode current collector, and a negative electrode current collector, where the positive electrode comprises a composite oxide having the general formula $Li_xMn_yNi_zCo_uAl_wO_n$, where $0<x \leq 2$, the sum of $y+z+u+w$ is about 1 to 2, and $2 \leq n \leq 4$, and $0.7 \leq y/(y+z+u+w)<1.0$.

Among the several advantages found to be achieved by the present invention, therefore, may be noted the provision of cathode active compounds that provides high capacity with low cost, good cycleability, and high stability—at voltage levels above about 4.2 volts; the provision of methods for preparing homogeneously mixed multi-metallic compositions that can effectively combine each metal's performance characteristics; the provision of such cathode active compounds that minimize the irreversible capacity loss during the first and subsequent delithiation cycles and that have increased mid-point cell voltage.

DETAILED DESCRIPTION OF THE PREFERRED EMBODIMENT

Figure 1:
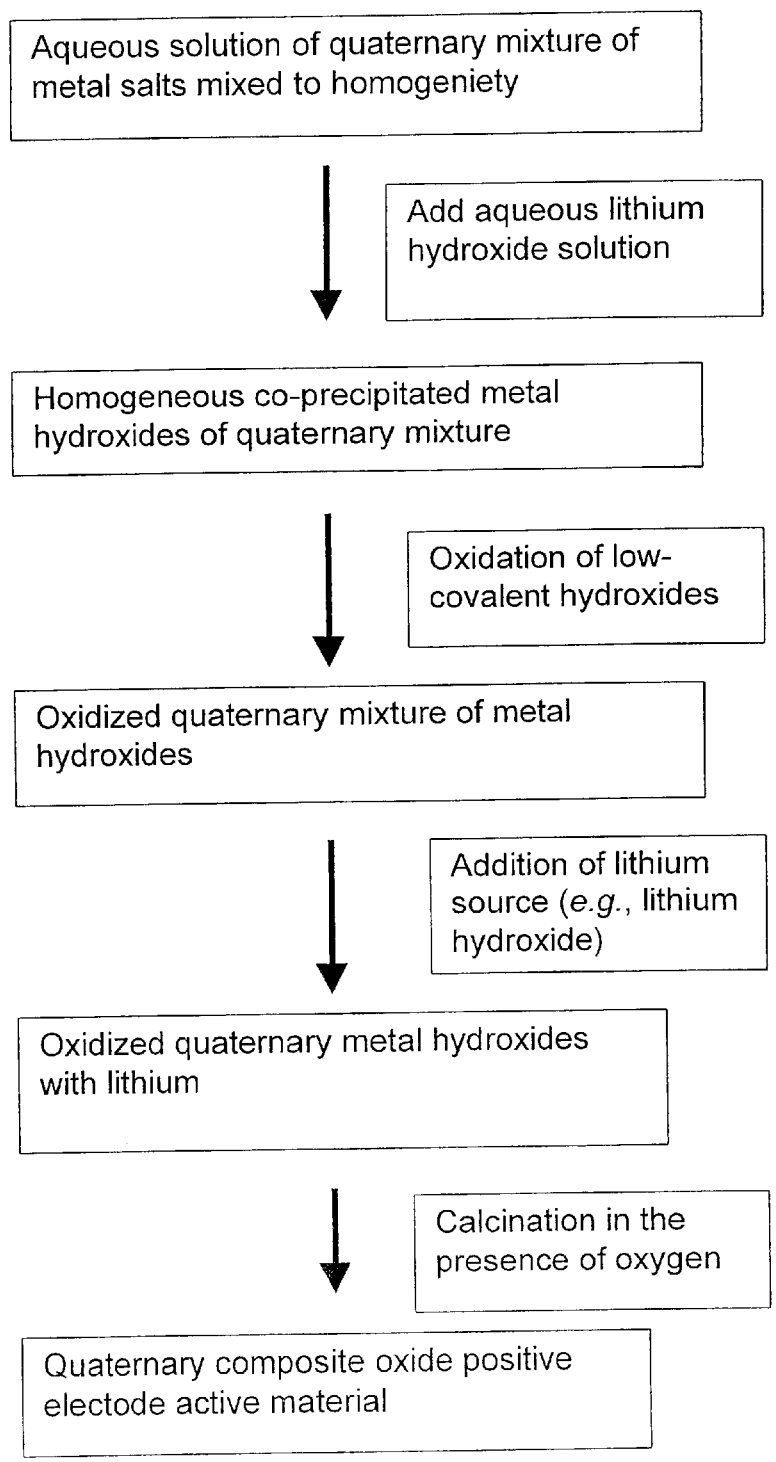
FIG. 1 is a flow chart illustrating the production of quaternary cathode materials by a co-precipitation process.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In accordance with the present invention, it has been discovered that new quaternary composite oxide materials can be produced that provide superior properties when used as positive electrode-active materials in lithium-based secondary batteries. The scope of the materials is generally formulated as $Li_xM1_yM2_zM3_uM4_wO_n$, where M1, M2, M3, and M4 are cationic metal components of the composite oxide and are selected from different metal elements that are described in detail below. For the purposes of the formulated material, the range of x can vary from 0 to 2 and the sum of $y+z+u+w$ is about 1 to 2. The range of the oxygen can vary from 2 to 4. A key feature of the new materials is that one of the metals that form the composite oxide—namely, M1, M2, M3 and M4—is present in an amount of at least about 70 mol percent of the combined amount of the four metals. In certain embodiments, the oxides may be either nickel-rich, or manganese-rich. As used herein, the composite oxide is referred to as being "nickel-rich" if nickel forms at least about 70 mol percent of the combined amounts of M1, M2, M3 and M4, and as "manganese-rich" if manganese forms at least about 70 mol percent of such metals.

The subject composite oxides may be a simple composite mixture of each individual metal oxide. It is believed that although the composite here may be considered as homogeneous physically, the performance relies upon the discrete particles of each metal oxide. These materials may be made to have a homogeneous structure on a molecular level. For the purposes of this application, the term "homogeneous" shall mean that the materials made from different metal components exist, in at least a major part, in a single-phase morphology in which the distribution of each metal element is ideally defined by unit cells of the crystal structure. The subject oxides may be substantially completely single phase. The performance of the material thus does not depend on each individual component, rather it depends upon the combining of the performance characteristics of all components.

It is believed that the composite oxide materials of the current invention have a unique structural arrangement that facilitates the transportation of lithium ions during charge/discharge. The structural arrangements may be amorphous, layered, spinel, shear, or other, according to the oxide composition. Compositions that are cobalt- and nickel-rich (>70 mol %) may have layered structures, while compositions that are manganese-rich (about 70 mol %, and above) may possess a spinel structure.

It is desirable that the present composite oxides combine the preferred characteristics of each metal element. Factors to consider in designing such a system include one or more of the following: capacity, electrochemical stability, thermal stability, conductivity, density, availability, cost, toxicity, preparation, morphology, bonding, homogeneity safety, thermal stability, voltage, current density, and moisture stability. For example, one component may have better electrochemical stability while another may have better thermal stability. One metal may provide a flat discharge profile (for example LiCoO$_2$) while another may show a two-stage discharge profile (for example LiMn$_2$O$_4$).

Positive electrodes that have been produced with the new quaternary composite oxides have shown superior properties when compared with electrodes using conventional electrode materials. For example, manganese-rich quaternary oxides surprisingly have demonstrated stable charge/discharge cycling at over 4.2 volts, in fact at over 4.6 volts and over 4.8 volts, with some materials showing stability at up to 5.0 volts, compared with a normal limit of about 4.2 volts with conventional materials, such as LiCoO$_2$.

The subject quaternary composite oxides have the general formula:

$$Li_xM1_yM2_zM3_uM4_wO_n \quad (1)$$

where x is equal to or between 0 and 2, n is equal to or between 2 and 4, the sum of y, z, u and w is equal to or between 1 and 2, and each one of y, z, u and w is always greater than zero. These relationships can also be expressed as, respectively, $0 \leq x \leq 2$, $2 \leq n \leq 4$, $1 \leq (y+z+u+w) \leq 2$, and y, z, u and w are each >0. As used herein, the symbol ($\leq$) is to be taken to mean "is equal to or less than", and the symbol ($\geq$) is to be taken to mean "is equal to or more than". Likewise, the symbol (<) is to be taken to mean "is less than" and the symbol (>) is to be taken to mean "is more than". In each one of the subject composite oxides, one of the M1, M2, M3 and M4 components is present in an amount that is at least about 70 mol percent of the combined amount of M1, M2, M3 and M4. This can be expressed, for example, as $0.7 \leq y/(y+z+u+w) < 1.0$, for the case where M1 is the component that is present at a level above 70 mol percent, and as $0.7 \leq z/(y+z+u+w) < 1.0$, for the case where M2 is the component that is present at a level above 70 mol percent.

As used herein, the term "quaternary composite oxide" means a composite oxide having four different cationic metal components that are in the form of oxides. For example, the subject composite oxides having the general formula: Li$_x$M1$_y$M2$_z$M3$_u$M4$_w$O$_n$, are such quaternary composite oxides, where the M1, M2, M3 and M4 components are the four different cationic metal components of oxides that form the lithium insertion compound, or lithium intercalation compound that reversibly accepts and donates lithium (Li) atoms. As used herein, "lithium insertion compound", and "lithium intercalation compound" both mean a compound composed of a crystalline lattice that acts as an electron donor and foreign electron acceptor by donating or accepting lithium atoms that are interspersed or diffused between the planes of the lattice. In such a reaction, the structure of the host is changed only by atomic displacements and the reaction does not involve a diffusive rearrangement of the host atoms. The guest species may be neutral, an electron donor, or an electron acceptor. More specifically, an intercalation compound, as that term is used in the present specification, refers to compounds in which lithium-ion can be topotactically and reversibly inserted/extracted over a finite range of solid solution.

In the present quaternary composite oxides, the components M1, M2, M3 and M4 are each different from the other and are selected from the group consisting of Ba, Mg, Ca, Sc, Ti, V, Cr, Mn, Fe, Ni, Co, Cu, Zn, Al, B, Si, Ga, Ge, As, Zr, Hf, Mo, W, Re, Ru, Rh, Pt, Ag, Os, Ir, Au, Sn, and lanthanides. In particular, M1, M2, M3 and M4 may be selected from the group consisting of Ti, V, Cr, Mn, Fe, Ni, Co, Cu, Zn, Al, Ga, Zr, Hf, Mg, Ca, and Sn, and, in certain instances, M1 is manganese, M2 is nickel, M3 is cobalt and M4 is aluminum.

Accordingly, the general formula for a certain form of the subject quaternary composite oxides is:

$$Li_xMn_yNi_zCo_uAl_wO_n \quad (2)$$

where: $0 \leq x \leq 2$, $2 \leq n \leq 4$, $1 \leq (y+z+u+w) \leq 2$, y, z, u and w are each >0, and one of Mn, Ni, Co and Al is present at a level of at least about 70 mol percent of the combined amount of Mn, Ni, Co and Al. In certain embodiments, either Mn or Ni will be present at a level of at least about 70 mol percent of the combined amount of Mn, Ni, Co and Al, and, in other embodiments, Mn will be present at a level of at least about 70 mol percent of the combined amount of Mn, Ni, Co and Al (i.e., $0.7 \leq y/(y+z+u+w) < 1.0$).

The variation of x (i.e., the relative amount of lithium in the lithiated oxide) can be controlled either by an electrochemical redox process or by the stoichiometry of the chemical synthesis. The electrochemical redox process may entail the use of lithium metal, the use of a lithium-ion containing reducing agent such as LiBu, LiAlH$_4$, or Li-superhydride, or the use of a lithium intercalation compound. Control of the amount of lithium by chemical synthesis refers to one of the following processes carried out with a lithium-ion containing agent: thermal dehydration, thermal decarbonylation, thermal decomposition, ion exchange, sol-gel process, co-precipitation, and similar processes that are well known in the art.

The quaternary composite oxides can be produced by mixing sources of the M1, M2, M3 and M4 metals in the desired relative amounts, adding lithium to the mixture, and calcining the mixture of lithium and M1–M4 in the presence of oxygen to form a lithiated composite oxide material having the general formula shown in formula (1), above.

One method of synthesizing the quaternary composite metal oxides is by simply intermixing the hydroxides of each of the four metals. The intermixed metal hydroxides can then be calcined in the presence of oxygen, usually at temperatures over about 500° C., to form a composite oxide. However, if solid forms of the metal hydroxides are used, this method generally requires lengthy reaction time and high temperatures as the reaction proceeds by diffusion of each component to the other components. Also the morphology of the resulting material will be difficult to retain in a single phase.

An alternative method of synthesis involves a solution sol-gel process. A sol-gel process refers to a process that includes a wet chemical method and a multistep process involving both chemical and physical processes such as hydrolysis, polymerization, drying, and densification. The transition of a liquid sol containing all desired metal components to a solid allows for the production of homogeneous materials in a wide variety of forms. Starting materials in the preparation of the sol include inorganic salts or organometallic compounds such as alkoxides. The preferred preparation process is first to make a solution sol by a series of hydrolysis and polymerization reactions to form a colloidal suspension, and then convert the sol into a gel. In the final stage, the gel is converted into dense cathode-active compounds after heat treatment. Inorganic salts and organometallic compounds for sol-gel processes may be selected from one or more of following: nitrates, sulfates, phosphates, halides, alkoxides, and polymeric organometallic oxoalkoxides.

In the present invention, it has been found that a way to make homogeneously mixed material is to start at the beginning of the material preparation process. A salt of each of the four metal components is placed into solution in a solvent in an amount (relative to the amount of the other three metals) that is proportional to the amount of the metal that is desired for the final quaternary composite oxide. The metals can then be co-precipitated from the solution to form a homogeneous mixture that contains the desired amount of each component. The precipitation can be carried out by the addition of a chemical that converts the soluble salt forms of each component into forms that are insoluble in the solvent. This can be illustrated in the following Equation 3, where nitrates of each of the four metals in water solution are converted into metal hydroxides, which are insoluble under the same conditions, by the addition of a hydroxide.

(3)

When the salts of the four metals are placed into solution in a solvent, it is believed that any liquid can be used as the solvent. For example, the liquid may be one in which the low-covalent salts of each of the four metals are soluble. When it is said that a salt is "soluble" in a solvent, what is meant is that the salt is soluble in the solvent at 20° C. in an amount of at least about 10 g/l, preferably at least about 50 g/l, more preferably at least about 100 g/l, and yet more preferably at least about 200 g/l. Water, alcohols, and volatile ketones and aldehydes, and mixtures of these are suitable solvents.

As mentioned above, the co-precipitation of the metals to form a homogeneous mixture can be carried out by any method. Although the addition of a chemical to convert soluble metal salts into insoluble forms (for example, into hydroxides when an aqueous solution is used) is a common method for precipitation, the use of temperature, phase change, and any other method that results in the formation of a homogeneous solid mixture of the metals can be used.

When a homogeneous mixture of the desired components of the composite oxide is obtained, a method for converting it to the oxide form is by a calcination step. Often the calcination step is the longest and energy-consuming step in the process for producing a composite oxide. Depending on the starting materials, the calcination step will lead to: (a) dehydration of the hydrides, decarbonylation of the carbonates; (b) oxidation of each metal element to a desired oxidation state; and (c) formation of the crystal structure of the material. In some cases, calcination may only lead to amorphous materials.

In quaternary systems, it is believed that it is difficult to prepare a single-phase composite oxide because of the tendency of quaternary systems to phase separate during either the lithiation step or during calcination. Compared with direct solid state synthesis, for example, the inventors have found that solution processes such as co-precipitation and gel formation by sol-gel methods are capable of providing materials that can be more tightly controlled during lithiation and calcination and consequently provide composite oxides having more tightly controlled final structure.

Surprisingly, the inventors have found that when oxygen is used to cause an interconnection between and among the M1–M4 metals before lithiation, the tendency of the mixture to phase-separate is significantly reduced. This oxidation may generally take place at a relatively low temperature, below about 120° C., for example. It is believed that when the homogeneous mixture of the M1–M4 hydroxides, after precipitation, is contacted with oxygen under conditions designed to provide that at least some of the hydroxides are further oxidized, the three-dimensional structure of the mixture is stabilized to a degree sufficient to largely prevent phase separation during lithiation and calcination. Lithiation can then take place after such partial oxidation. One method to facilitate this low temperature oxidation is by the use of low covalent metal ions as the precursors for the solution process. As used herein, the terms "low covalent", "lowest oxidation state" and "low valence form", when used to describe the oxidation state of a metal ion, are intended to have the same meaning. The low covalent ions are believed to permit the acceleration of the oxidation of the precursors at lower temperatures than normally required, and thereby to reduce subsequent phase separation. It is well-known that manganese has various oxidation states. The main oxidation states of manganese are +2, +3, +4, +6, +7. This is determined by the electronic configuration of managese, $3d^5 4s^2$, in which all seven electrons can be removed.

Because of its ability to form different oxidation states, manganese oxides are also diverse. Depending on acidic or basic conditions, these oxides can exist as different forms. Various metal oxides and their relationship versus their redox potential are described by D. F. Shriver et al., in *Inorganic Chemistry*, W. H. Freeman and Company, p. 654, (1990). That reference describes the redox potential for manganese oxides at various acidic and basic pH values in terms of the diagrams shown below. The upper diagram shows acidic conditions and the bottom diagram shows basic conditions.

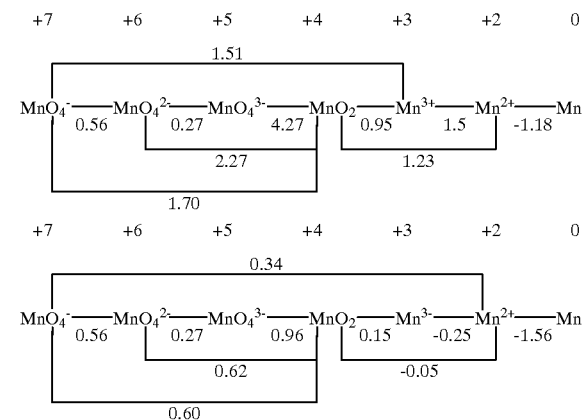

From consideration of the redox potential under basic conditions, the oxidation of low-covalent Mn(II) to Mn(IV) is much easier. Since the potential of $MnO_2/Mn(OH)_2$ couple, $E°MnO_2/Mn(OH)_2 = -0.05V$, is lower than that of $O_2/OH-$ couple, $E°=0.401V$, $Mn(OH)_2$ can be easily oxidized than, for example, $Mn(OH)_4$, by molecular oxygen in air to form oxo compounds, as follows:

(4)

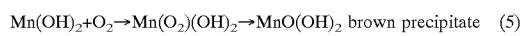
(5)

The ease of oxidation of low covalent manganese compounds is believed to be important for the current invention. The relative ease of the introduction of oxygen into manganese-rich materials in air at ambient temperature is believed to provide a significant advantage to fix the material structure through oxygen bridges.

Besides Manganese, other low covalent metal ions such as Co(II), Ni(II), Cr(Iii), Fe(II), Cu(I) and others are known that have a strong tendency to react with oxygen at low temperatures to form a variety of oxygen compounds. Thus, it is believed that the multi-metallic mixtures containing at least one low covalent metal are particularly useful. Therefore, low covalent metal ions such as Mn(+2), Co(+2), Ni(+2), Cr(+3), Fe(+2), Cu(+1), as opposed to the higher oxidation states of each of these elements may be preferred.

Without being bound to this, or any other particular theory, the inventors believe that the use of salts having the low-valence forms of the four metal cations results in the formation of a composite oxide precursor material that can be oxidized at relatively low temperatures to stabilize the three-dimensional structure of the composite with the result being that when the mixture is lithiated and calcined, a final quaternary composite oxide having only a single phase is produced. At least one of the metal salts may comprise the metal in its lowest oxidation state. In other embodiments, at least two, at least three, or all four of the metal salts may comprise the metals in their lowest oxidation states. A particular mixture of salts, therefore, includes salts of Mn(+2), Ni(+2), Co(+2) and Al(+3).

A method by which this low-temperature oxidation can be carried out is to co-precipitate the metals as hydroxides and to separate the precipitated homogeneous mixture from the liquid solution, and then to heat the mixture in the presence of air to a temperature of between about 40° C. and about 120° C. for a period sufficient for at least some of the hydroxides to be further oxidized. When it is said that "at least some" of the hydroxides are further oxidized, it is meant that any fraction of the hydroxides that are present in the mixture are further oxidized according to the type of reaction shown in equation (5). At least about 1% of the hydroxides, in some cases at least about 5%, and, in other cases, at least about 10% of the hydroxides may be further oxidized. In order to facilitate this reaction, the mixture may be heated in air at a temperature of between about 60° C. and about 100° C. for a period of from about 1 day to about 8 days or, alternatively, at a temperature of about 80° C. for a period of from about 1 day to about 5 days. It is desirable that the temperature that is used for this step be low enough to avoid phase separation of the precipitated mixture.

An alternative process for low-temperature oxidation is to contact the metal hydroxides with oxygen while the hydroxides are still in the form of a suspension in the solvent. In this instance, air, oxygen gas, or any other form of, or source of oxygen can be used to supply the oxygen. A common method would be to bubble air through the suspension at a temperature of from about room temperature to about 100° C. Another method would be to contact the hydroxides with a source of oxygen in solution form, for example, by the addition of peroxides to the solution. Aqueous hydroperoxides could be the source of the oxygen and could be added to the solution during or after the precipitation step. It is believed that advantages of this method of oxidation may be that the oxidation reaction can be more precisely controlled by controlling the type, amount, and concentration of such peroxides that are added, by controlling the temperature of the solution, and with the result being that uniform oxidation of the hydroxides is obtained.

Another aspect of the preparation method is the addition of lithium after precipitation and, typically, after the low temperature oxidation. In the case of a co-precipitation process from an aqueous solution, it is not known to be possible to directly co-precipitate a Li ion into the mixture. In such cases, the co-precipitation of other metal components can be obtained in a first step and a lithium ion source can be added to the homogeneous precipitated mixture in a subsequent step. The lithium ion source may be one of the following compounds: $Li_2CO_3$, LiOH, $LiNO_3$, $LiPO_4$, LiF, LiCl, LiI, $LiOH.H_2O$, $Li_2SO_2$, LiOAc. The source of lithium may be hydrated LiOH, since the water molecules are believed to facilitate the binding and diffusion of the lithium ions into the material. For certain compositions of the subject quaternary composite oxides, namely in manganese-rich oxides, it is also possible that if one of the desired components does not have a suitable precursor for the initial co-precipitation, the same principle of adding lithium ions can be used to add such components in a subsequent step together with a lithium source.

A particular process for the production of the subject quaternary composite oxides by co-precipitation from solution is illustrated in FIG. 1. As shown, metal nitrates are used as the metal salts that are used to form a solution in water. LiOH is added as a base to cause the co-precipitation of metal hydroxides. If desired, oxidation of the homogeneous precipitated mixture can then carried out as described above to further oxidize the metal hydroxides. Lithium is added, and the mixture is calcined to form the final lithiated quaternary composite oxide.

The use of the low-temperature oxidation step as a method to avoid phase separation during lithiation and/or calcination has been described above in the context of the preparation of the quaternary composite oxides of the present invention. However, it is believed that this method can be used advantageously for the preparation of any composite oxide material having at least two metal components. Thus, the preparation of binary and ternary, as well as quaternary composite oxides would benefit from the application of this step.

Figure 2:
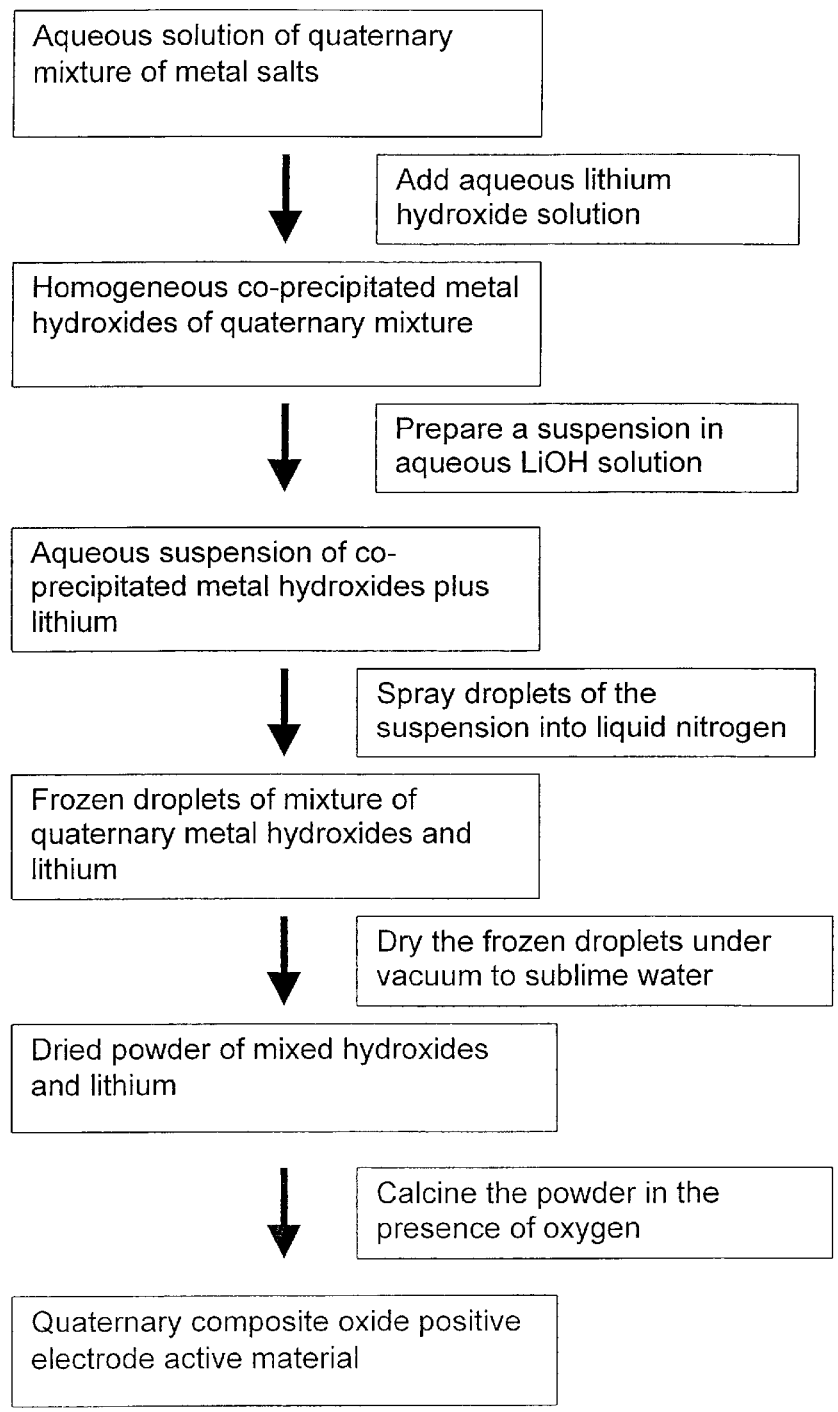
FIG. 2 is a flow chart illustrating the production of quaternary cathode materials by co-precipitation followed by a freeze drying process.

A modification to the production process is the addition of a freeze-drying, or lyophilization, step between the precipitation and the calcination. PCT Patent Application WO 98/16900 discloses a freeze-drying process in the preparation of aluminum-doped lithium cobalt oxide. For the present quaternary systems, the freeze-drying process is believed to be useful in effectuating the homogeneous distribution of lithium-ions in the precursor mixture before calcination. A schematic flow sheet of a production process that incorporates a freeze-drying step is shown in FIG. 2. In this method, a lithium source is added to the homogeneous precipitate. Lithium sources include the water-soluble lithium-containing compounds $Li_2CO_3$, LiOH, $Li_2SO_4$, $LiNO_3$, $Li_3PO_4$, LiF, LiCl, and LiI. An aqueous suspension of the homogeneous precipitate and the added lithium is separated into droplets, such as by spraying, and the droplets are frozen. One method for preparing such frozen droplets is to spray the suspension into a fluid, such as liquid nitrogen, that is at a temperature below 32° F. After the frozen droplets are recovered from the freezing medium, they are subjected to drying under vacuum, so that the water sublimes from the droplets, leaving a dry mixture of lithium hydroxide and the hydroxides of nickel, manganese, cobalt and aluminum. If desired, the dried droplets can be milled to a powder prior to being calcined into the final composite oxide.

After the low-temperature oxidation, if it is used, or prior to the freeze-drying step, lithium can be added to the mixture. The amount of lithium that may be added is within a range of about 0.9 to about 1.1 of the combined amounts of the nickel, manganese, cobalt and aluminum, on a molar basis. Any of the previously mentioned sources of lithium can be used for this step, and the lithium may be well mixed into the oxidized mixture prior to calcination, or added to the solution prior to its freeze-drying. Lithium hydroxide may be the source of lithium. After the addition of lithium, the mixture can be calcined as described above.

Another aspect of the current invention is the structure of the material produced. It is expected that the crystal structure of a given quaternary material may not resemble that of any compound based on a single metal. This will be particularly true if each component in the material has close ratios, such as, 1:1:1:1. However, a quaternary material may still adopt a structure that is similar to a single metal compound in the case where one of the components is the major part of the composition. Structures particularly suitable for the current invention are ones that are able to facilitate the transportation of lithium ions with very low irreversible capacity loss and without collapse of the structure during lithium-ion intercalation.

In certain embodiments, the quaternary composite oxides of the present invention may have only a single phase. In the case of nickel-rich materials, the single phase may typically be a layered structure, while in the manganese-rich materials, the single phase may typically be a spinel structure. However, it should be noted that the assignment of precise structure to quaternary systems is somewhat arbitrary due to the nature of the systems in solid form.

The positive electrode-active materials of this invention can be used in any application or manner that any conventional positive electrode-active material is used. One use of the new materials is for the production of cathodes for use in electrochemical cells. In a typical electrochemical cell, key components are a positive electrode, a negative electrode, and an electrolyte which electrochemically interconnects the positive electrode and the negative electrode. It is often desirable for the positive and negative electrodes to be isolated from each other by a separator.

For the production of positive electrodes of the present invention, the subject quaternary composite oxide material can be mixed with a binder and a conductive material, such as carbon black, and the mixture is formed into an electrode. A specific example is to mix 200 parts by weight of the quaternary composite oxide with 100 parts of binder polyvinyldifluoride (PVDF 2801 and 2751, available from Elf Atochem, Philadelphia, Pa.), and 30 parts of acetylene carbon black (available from Alfa Aesar Chemical, Ward Hill, Mass.), and to mix these materials in a SPEX ball-mill mixer (available from Spex CertiPrep, Metuchen, N.J.) until they are homogeneously intermixed. The mixed material is then removed from the mill and pressed into a pellet. The pellet electrode is then dried under vacuum at a temperature of from about 60° C. to about 140° C. for at least about 12 hours before testing. Various shapes of electrodes include squares, rectangles, bars and circles, but electrodes can be of any desired shape.

Negative electrodes (or anodes) for use in the current invention include lithium metal and lithium intercalation compounds. A particular anode useful in the present invention is thin lithium metal foil, commercially available from Aldrich, Fisher, and Strem. A lithium intercalation compound for use as an anode may be one of the following materials: natural graphite, synthetic graphite, non-graphite carbon materials, and lithium tin oxides. Such intercalation compounds are typically pure natural or synthetic graphites that can be purchased from various commercial sources such as Aldrich.

Various non-aqueous organic solvents and lithium containing salts can be used to create a suitable electrolyte composition in the current invention. Non-aqueous organic solvents include one or more of the following: propylene carbonate (PC), ethylene carbonate (EC), dimethyl carbonate (DMC), diethyl carbonate (DEC), ethyl methyl carbonate (EMC), tetrohydrofuran (THF), methyl tetrohydrofuran (MTHF), dimethyl tetrohydrofuran (DMTHF), diethyl ether (DE), acetonitrile, and any combinations containing one or more solvents listed above. Lithium salts include $LiPF_6$, $LiBF_4$, $LiClO_4$, $LiCl$, $LiF$, $LiI$, $LiSO_3CF_3$, $LiSO_3CMe$, $LiB(C_6H_5)_4$, $LiN(SO_2CF_3)_2$, and $LiAsF_6$. The electrolyte combination may be prepared as one of the following: a solvent from the above list and a lithium salt listed above; a binary mixture of two solvents and a lithium salt; a ternary or higher mixture of three or higher solvents and a lithium salt; a mixture of at least two solvents and at least two lithium salts. In certain embodiments, an electrolyte solution may be composed of $LiPF_6$ in a mixture of PC and EC, or PC and EMC, or PC, EC, and DMC. The lithium salt solution may be in the range of 0.5 M to 4.0 M, with a particular range being about 1 M to about 3 M, and another particular range being about 2.5 M. Particular electrolyte compositions may be 1 M or 2.5 M $LiPF_6$ solution in 1:1 propylene carbonate (PC) and ethylene carbonate (EC).

Separators used in the current invention may be various microporous membranes. Microporous films useful in the present invention are typically those that are electrochemically stable and will not decompose during cycling. Commercially available separators can be obtained from Hoechst Celanese of Dallas, known as Celgard 2300, Celgard 2400, and Celgard 2700. For use in the examples, separators were cut into desired shapes, which are usually larger than both the cathode and anode, in order to avoid the shortening of the cell.

The cathode materials that are a subject of the current invention are suitable for lithium, lithium-ion, and lithium-ion polymer cells. For the purposes of this application, the term "lithium batteries" shall mean batteries that use lithium metal as an anode component while the terms "lithium-ion" and "lithium-ion polymer batteries" shall mean batteries that use lithium insertion compounds as anode components. The term "lithium-based batteries" shall refer to all three types of batteries.

Figure 3:
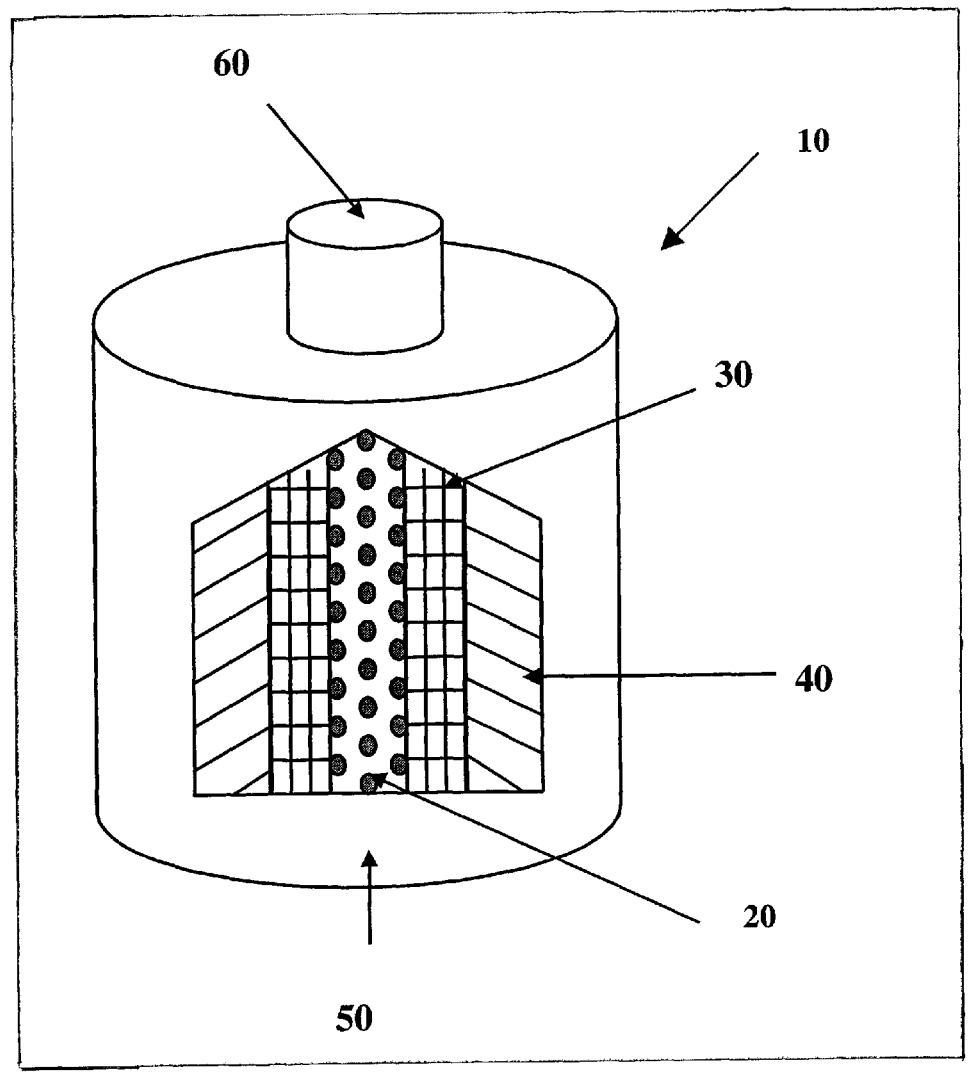
FIG. 3 is an illustration of a lithium-ion cell as an embodiment of the present invention.

As shown in FIG. 3, a lithium-based battery 10 (regardless of actual battery type) is composed of an anode 20 (lithium foil for lithium cell, an intercalation compound for lithium-ion and lithium-ion polymer cells); an electrolyte 30 (a lithium salt solution and a separator for solution cells and a gel electrolyte containing lithium salt solution for polymer cells); a cathode 40; current collectors for both electrodes 50 and 60; and a sealable cell container 70. The construction of such batteries is well known in the art and is described, among other places, in U.S. Pat. Nos. 5,370,948, 5,804,335, 5,792,574, 5,626,635, 5,609,975, 5,599,642, 5,514,496 and 5,490,320.

A lithium-ion battery generally includes a sealable cell container, a positive electrode, a negative electrode, an electrolyte solution, a separator, a positive electrode current collector, and a negative electrode current collector. In the lithium-ion batteries of the present invention, the positive electrode comprises either a composite oxide having the general formula $Li_xMn_yNi_zCo_uAl_wO_n$, where $0<x\leq2$, the sum of $y+z+u+w$ is about 1 to 2, and $2\leq n\leq4$, and $0.7\leq y/(y+z+u+w)<1.0$ (a manganese-rich cathode material), or a composite oxide having the general formula $Li_xMn_yNi_zCo_uAl_wO_n$, where $0<x\leq2$, the sum of $y+z+u+w$ is about 1 to 2, and $2\leq n\leq4$, and $0.7\leq z/(y+z+u+w)<1.0$ (a nickel-rich cathode material). In either case, the composite oxide may be in a single phase.

When the lithium-based battery is a lithium-ion polymer battery, the sealable cell container, the positive electrode, the negative electrode, and the separator comprise flexible polymeric materials.

In order to test the performance characteristics of the subject batteries, test cells, of either coin cell or Hoshen HS design, were constructed by the general procedure of first placing a lithium metal anode and a separator in a sealable cell container, and the cell was then flooded with 1 M $LiPF_6$ PC and EC solution (1:1). The cathode was next placed on top of the separator and the entire assembly was then sealed within the cell container. In the case of HS testing cells, copper and aluminum were used as current collectors.

The following examples describe various embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

General Procedures

In the examples, all percentages are given on a weight basis unless otherwise indicated. All material syntheses were conducted in air. Electrochemical cell fabrication was performed in a complete glove box system featuring NEXUS ONE style technology with computer display and monitoring of both moisture and oxygen levels (available from Vacuum Atmospheres Company, Danvers, Mass.).

Solvents, such as acetone, hexane, ethylene carbonate (EC), propylene carbonate (PC) and dimethylethylene carbonate (DMC) were obtained from Aldrich Chemical Co., and were used as received. 1M solutions of $LiPF_6$ in 1:1 mixtures of either PC:EC or EC:DMC were freshly prepared in the glove box before cell fabrication.

Chemicals, such as manganese nitrate, nickel nitrate, cobalt nitrate, aluminum nitrate and lithium hydroxide were obtained from Aldrich Chemical Co., and were used as received. Polyvinyl difluoride (PVDF) 2801 and 2751 were obtained from Elf Atochem. Electrochemical grade $LiCoO_2$ and $LiMn_2O_4$ were obtained from Aldrich Chemical Co., and were used as received.

Cell charge/discharge testing was carried out using a Maccor battery tester (Series 4000, available from Maccor Inc, Tulsa, Okla.). Rate of charge/discharge current was estimated based on the weight of active material in the cathode, depending on the size and surface area for each individual cell. The cell voltage range was determined by charging the cut-off voltages at 4.2, 4.4, 4.6, 4.8 and 5.0 volts. The cell performance was calibrated with a known commercial cathode material ($LiCoO_2$), obtained from FMC Corporation.

EXAMPLE 1

This illustrates the production of quaternary cathode materials.

The procedure to make quaternary cathode materials comprises the following steps: (a) making a quaternary mixture solution of desired metal nitrates in water; (b) adding LiOH solution to the above quaternary nitrate mixture solution to effect the homogeneous co-precipitation of the respective metal hydroxides; (c) washing the precipitate to eliminate lithium nitrates; (d) drying the hydroxide mixture; (e) grinding the dry hydroxide mixture and adding stoichiometric amounts of LiOH; and (f) calcining the solid mixture at high temperature to afford lithiated quaternary metal oxide powder.

In a specific embodiment of the above procedure, a 100 ml of quaternary nitrate solution was prepared by mixing 1 M solutions of nickel nitrate, manganese nitrate, cobalt nitrate, and aluminum nitrate in a volumetric ratio of 70:20:5:5 at room temperature with constant stirring. The obtained solution was then treated with dropwise addition of 1.05 eq. Of 1 M LiOH aqueous solution under stirring for about 2 hrs. The resulting precipitate was separated from the aqueous solution by using a centrifuge and washed two times with water and separated each time in the centrifuge. For purposes of the examples, the centrifuge consisted of an IEC clinical centrifuge from the International Equipment Co., of Needham Heights, Mass. The speed setting on the centrifuge was set between 3–5. The washed mixture was then placed in an oven at 80° C. to remove water. For the purposes of the examples the oven consisted of a constant temperature oven Model DK-62, from American Scientific Products. The dried powder was then mixed with 1.05 eq. Solid $LiOH \cdot H_2O$ and mixed by a SPEX ball-mill mixer (Spex CertiPrep, Metuchen, N.J.) for 30 mins. The material was next transferred into a porcelain crucible and calcined at 750° C. for 24 hrs in air. For purposes of the examples, the furnace was an Isotemp Programmable Muffle Furnace from Fisher Scientific. The calcined material was ground again by a SPEX ball-mill mixer for 30 mins and re-calcined at 750° C. for 24 hrs in air. The calcined powder showed a black color.

Figure 4:
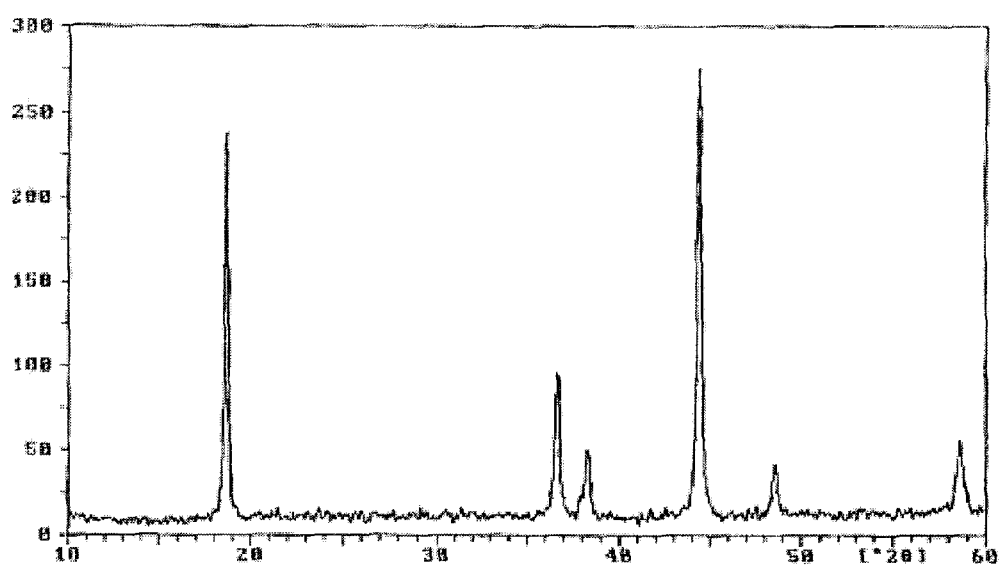
FIG. 4 is a graph showing the x-ray diffraction pattern of a sample of $LiNi_{0.7}Mn_{0.2}Co_{0.05}Al_{0.05}O_2$ sintered at 750° C. for 24 hours.

In this regard, FIG. 4 shows the x-ray diffraction pattern of a sample of the powder calcined at 750° C. for 24 hrs. The longer calcination time does not affect the diffraction pattern, with only minor changes on the diffraction intensity. Compared to pure $LiNiO_2$ and other mixed nickel containing systems, the x-ray diffraction pattern in this invention reveals the existence of a single-phase material. The analysis of the diffraction pattern under hexagonal setting furnishes lattice constants to be a=2.487 and c=14.3425 Å, respectively. It should be noted that the structural assignment of this system as a layered structure is arbitrary because of the nature of dealing with quaternary systems in a crystalline state.

EXAMPLE 2

This illustrates the preparation of cathode materials involving a freeze-drying process.

The procedure to make quaternary cathode materials comprises the following steps: (a) making a quaternary mixture solution of desired metal nitrates in water; (b) adding LiOH solution to the above quaternary nitrate mixture solution to effect the homogeneous co-precipitation of the respective metal hydroxides; (c) washing the precipitate to eliminate lithium nitrates; (d) mixing the precipitate with a LiOH aqueous solution to make a homogeneous slurry; (e) adding the slurry into liquid nitrogen to form frozen droplets; (f) drying the frozen droplets under vacuum by a Labconco Lyophilizer system (Labconco Corp., Kansas City, Mo.) to sublime the water; (g) grinding the dried droplets to fine powders; (h) calcining the powder at desired temperature to afford lithiated quaternary metal oxide powder.

In a specific embodiment of the above procedure, a 100 ml of quaternary nitrate solution was prepared by mixing 1 M solutions of nickel nitrate, manganese nitrate, cobalt nitrate, and aluminum nitrate in a volumetric ratio of 70:20:5:5. The obtained solution was then treated with the dropwise addition of 1.05 eq. of 1 M LiOH aqueous solution under stirring for about 2 hrs to precipitate the metals as the respective metal hydroxides. The resulting precipitate was separated using a centrifuge and washed two times by water and separated each time in the centrifuge. The washed mixture was then placed in a beaker and mixed with 1.05 eq. of LiOH in 20 ml of water to afford slurry. The slurry was next freeze-dried by first forming droplets by adding the slurry into liquid nitrogen to freeze the droplets. The frozen droplets were recovered and dried at room temperature under full vacuum using a vacuum oven. For the purposes of the examples, the vacuum oven was a Vacutherm Vacuum Oven obtained from Kendro Laboratory Products of Germany. The dried droplets were next ground in a SPEX ball-mill mixer for 5 mins and then transferred into a porcelain crucible and calcined at 750° C. for 24 hrs in air. The calcined material was ground again by a SPEX ball-mill mixer for 30 mins and re-calcined at 750° C. for 24 hrs in air. The calcined powder showed a black color.

EXAMPLE 3

This illustrates a procedure for producing positive electrodes (cathodes) from the novel positive electrode-active material.

Positive electrodes in the current invention are prepared in two general ways. For solution cells, electrodes were made by a pellet process while for polymer cells, electrodes were fabricated by a film process.

Drying process: a mixture of 200 parts of cathode oxide (the material made as described in Examples 1 or 2, above), 100 parts of binder polyvinylidene fluoride (PVDF) (Elf Atochem, Philadelphia, Pa.), and 30 parts of acetylene carbon black (Alfa Aesar Chemical, Ward Hill, Mass.) were first prepared in a SPEX ball-mill mixer (Spex CertiPrep, Metuchen, N,J.) and then pressed into a pellet. The resulting pellet electrode was then dried under vacuum at a temperature range of 60° C. to 140° C. for at least 12 hrs before testing. Various shapes of the electrode include squares, rectangular, and round. The thickness of the electrodes may be from about 100 to 200 $\mu$m and the weight of the electrodes may be about 10~140 mg.

Wet process: a mixture of 100 parts of cathode oxide, 16 parts of binder PVDF, 5 parts of acetylene black, and 200 parts of acetone were first prepared in a reaction vessel at 50° C. and then film was cast on a glass plate using a doctor blade. Upon drying of the solvent, the uniform film was easily removed from the glass plate and the electrodes with desired sizes were obtained by use of a cutting board or a punch. The resulting electrodes were then dried under full vacuum at a temperature range of 60 to 140° C. for at least 12 hrs before testing. Shapes of the electrodes include square, rectangular, and round. The thickness of the electrodes may be between 50 to 200 $\mu$m and the weight of the electrodes may be 10~140 mg.

EXAMPLE 4

This illustrates a procedure for the production of negative electrodes.

The current invention uses both lithium metal and carbon anodes. When lithium negative electrodes (anodes) were required, lithium foil (Aldrich, thickness 0.75 mm) was cut into the desired shape and size and then used directly in the cell.

When carbon anodes were required, they were produced by the following procedure:

Drying process: a mixture of 200 parts of graphite (Aldrich), 100 parts of binder PVDF (Alt Autochem, Philadelphia, Pa.), and 30 parts of acetylene black were first prepared in a SPEX ball-mill mixer and then pressed into a pellet. The resulting pellet electrode was then dried under a vacuum at a temperature range of between 60° to 140° C. for at least 12 hrs before the testing. The shapes of the electrodes include squares, rectangular, and round. The thickness of the electrodes may be from about 100 to 200 $\mu$m and the weight of the electrodes may be about 10~140 mg.

Wet process: a mixture of 100 parts of graphite, 16 parts of binder PVDF, 5 parts of acetylene black, and 200 parts of acetone was first prepared in a reaction vessel at 50° C. and then film was cast on a glass plate using a doctor blade. Upon drying of the solvent, the uniform film was easily removed from the glass plate and the electrodes with desired sizes were obtained by a cutting board or a punch. The resulting electrodes were then dried under full vacuum at a temperature range of between 60° to 140° C. for at least 12 hrs before the testing. The shapes of the electrodes include square, rectangular, and round. The thickness of the electrodes may be between about 50 to 200 $\mu$m and the weight of the electrodes may be about 10~140 mg.

EXAMPLE 5

This example illustrates methods for the production of electrochemical cells.

Solution cells: The solution testing cells in the current invention are from Hohsen Corp. (Japan) identified as HS testing cell. Testing type cells were constructed by the following procedures: The lithium metal anode and separator were placed on top of a copper-mesh current collector in the cell and then flooded with 1 M $LiPF_6$ PC and EC solution (1:1). The cathode was next placed on top of the separator and was followed by an aluminum current collector. The cell was then sealed and tested on a Maccor battery tester (Maccor Inc., Tulsa, Okla.).

EXAMPLE 6

This example illustrates the electrochemical testing of the electrochemical cells of the present invention.

Positive electrodes that were made from the compounds from Examples 1 and 2 were tested in a Hohsen testing cell. The cells were charged and discharged at constant current densities from 0.05 to 0.5 mA/cm$^2$ of electrode area using the battery tester.

Figure 5:
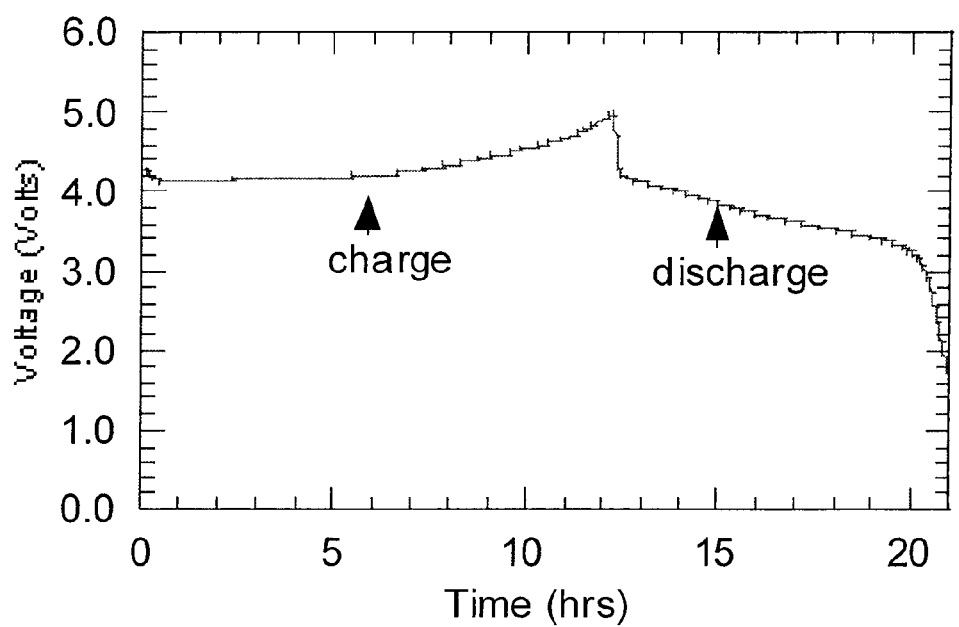
FIG. 5 is a graph showing the charge/discharge profile of $LiNi_{0.7}Mn_{0.2}Co_{0.05}Al_{0.05}O_2$ in a solution lithium-ion cell with lithium metal foil as an anode.
Figure 6:
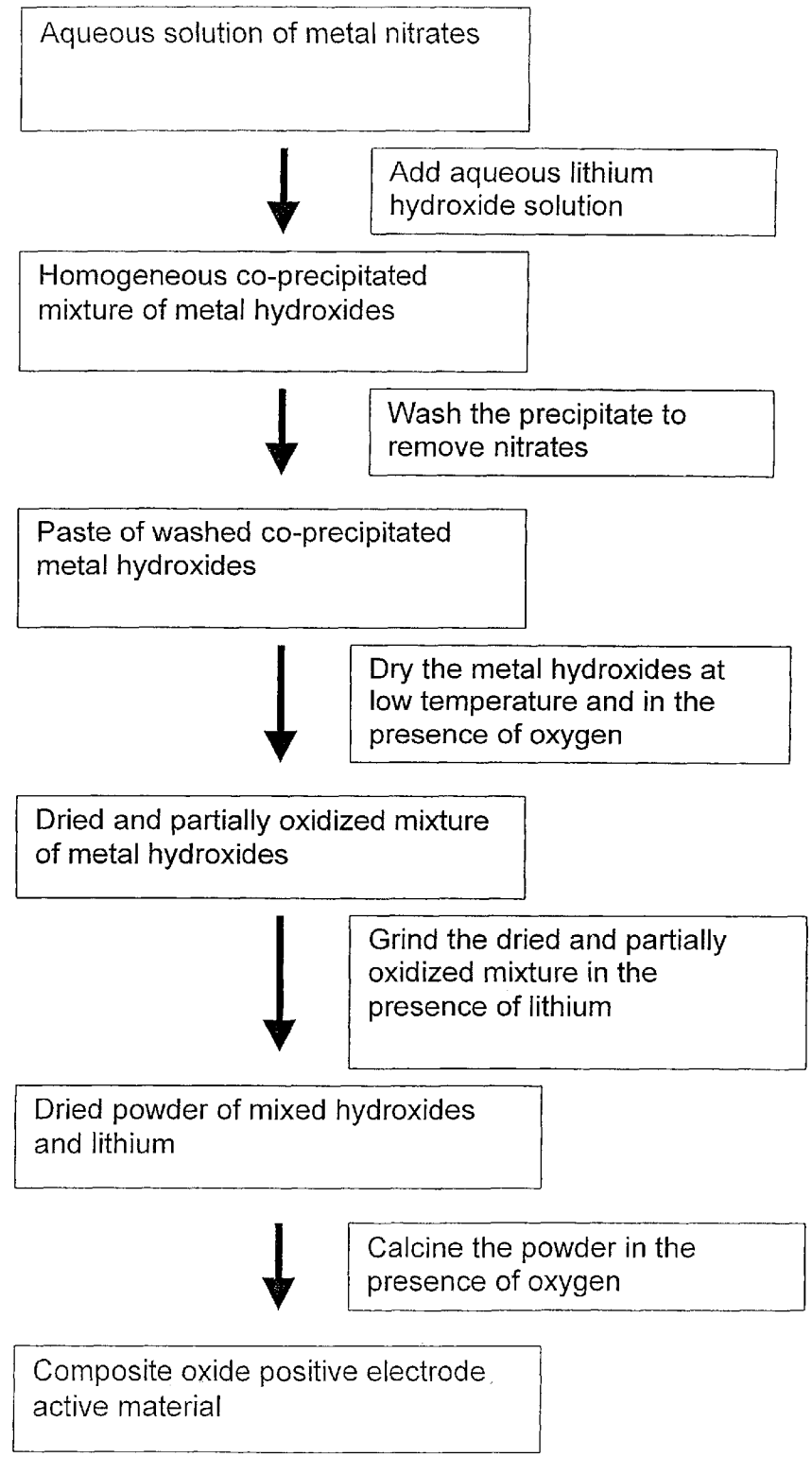
FIG. 6 is a flow chart showing the preparation of quaternary cathode materials by co-precipitation followed by a slow oxidation process.

FIG. 5 shows the charge/discharge profile for the solution cell with a quaternary Ni-rich cathode, prepared according to Example 1. The charging current was about 0.4 mÅ/cm$^2$ of the cathode electrode. The charging curve shows that the voltage was well above 4 volts, which is high when compared with single metal cathode materials made from nickel, cobalt, and manganese. The discharge voltage window was determined in an incremental manner to be between 1.5 to 5 volts using the battery tester. The capacities for charge and discharge for the first cycle were calculated to be ~200 and 164 mÅh/g, respectively.

The voltage of the Ni-rich cell reaches rapidly to the plateau above 4 volts and then slowly goes up to 5 volts. The discharge reveals a well-defined sloping profile between 4.2 and 3 volts, which is different when compared to other flat discharge profiles. The sloping discharge profile is the desired property for accessing the different discharge rates without the heating caused by internal resistance.

EXAMPLE 7

This example illustrates the production of a manganese-rich quaternary composite oxide positive electrode-active material including a slow oxidation step.

The procedure to make quaternary cathode materials comprises the following steps: (a) making a quaternary mixture solution of desired metal nitrates in water; (b) adding LiOH solution to the above quaternary nitrate mixture solution to effect the homogeneous co-precipitation of the respective metal hydroxides; (c) washing the precipitate to eliminate lithium nitrates; (d) contacting the metal hydroxide precipitates with an oxygen source under conditions that oxidation takes place; (e) mixing the oxidized precipitate with LiOH to introduce the lithium source; and calcining the powder at desired temperature to afford lithiated quaternary metal oxide powder.

In a specific embodiment of the above procedure, a 100 ml of quaternary nitrate solution was prepared by mixing 1 M solutions of nickel nitrate, manganese nitrate, cobalt nitrate, and aluminum nitrate in a volumetric ratio of 25:70:2.5:2.5. The obtained solution was then treated with the dropwise addition of 1.05 eq. of 1 M LiOH aqueous solution under stirring for about 2 hrs to precipitate the metals as the respective metal hydroxides. The resulting precipitate was separated using a centrifuge and washed two times by water and separated each time in the centrifuge. The resulting paste was then placed in an oven and slowly dried and oxidized at 80° C. for a period of from 1 to 5 days, depending upon the composition. The dried powder was then mixed with about 1.1 equivalents of $LiOH \cdot H_2O$, transferred into a porcelain crucible, and calcined at 750° C. for 24 hrs in air. The calcined powder showed a brown color.

Figure 7:
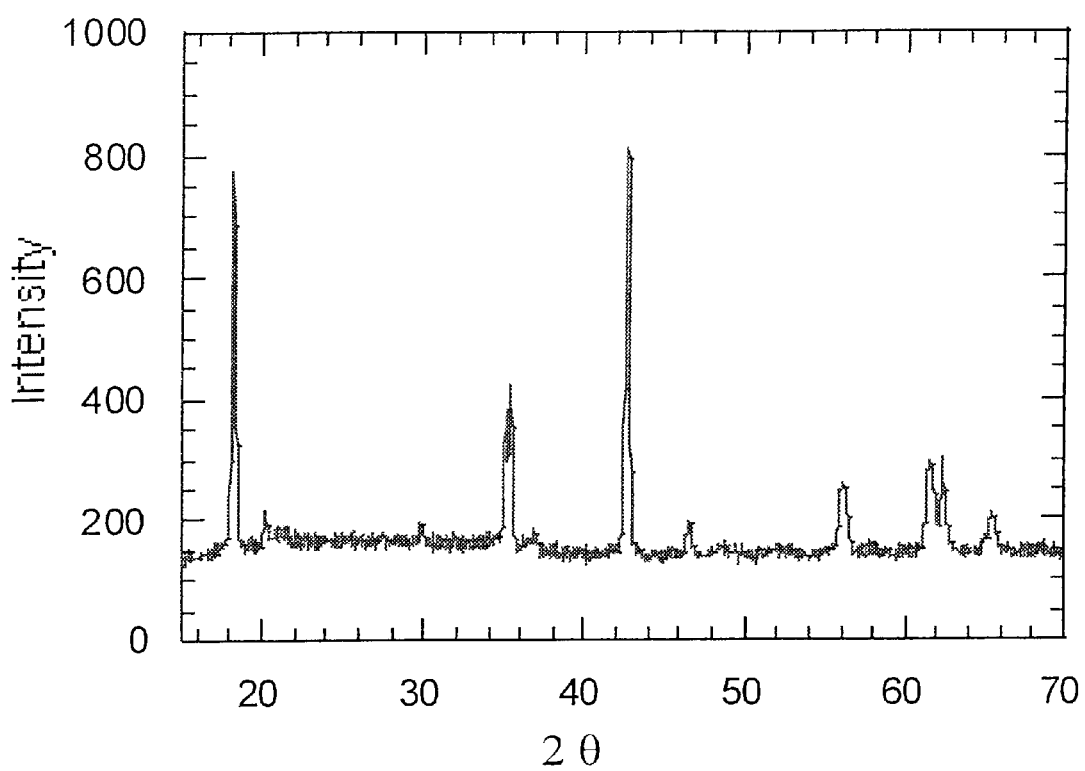
FIG. 7 is a graph showing the x-ray diffraction pattern of a sample of $LiNi_{0.25}Mn_{0.7}Co_{0.025}Al_{0.025}O_2$ sintered at 750° C. for 24 hours.

An x-ray diffraction of this powder was obtained and is shown in FIG. 7. As can be seen from the figure, the material demonstrates a pattern characteristic of a single-phase material.

EXAMPLE 8

This example illustrates the production of lithium-ion cells having positive electrodes that contained manganese-rich quaternary composite oxide positive electrode-active material and shows the charge/discharge capacity of those cells.

Several manganese-rich positive electrode-active materials having different compositions were produced by the method of Example 7. Positive electrodes for testing were made from each of the test materials by the method described in Example 3. Negative electrodes and lithium-ion test cells were produced by the methods described, respectively, in Examples 4 and 5. The lithium-ion test cells having manganese-rich quaternary oxides as cathodes were then tested for operating voltage range and charge/discharge capacity over several cycles as described in Example 6.

Determination of operating voltage range for the Mn-rich cathode materials was the first step for performance evaluation. It was desired to see if the Mn-rich materials had different characteristics than the typical $LiCoO_2$, $LiNiO_2$ and $LiMn_2O_4$ electrodes, which are stable only between about 2.5 to 4.2 volts. Accordingly, cells having a cathode comprising the quaternary composite oxide that was produced in Example 7 ($LiNi_{0.25}Mn_{0.7}Co_{0.025}Al_{0.025}O_2$) were cycled in the following voltage ranges: 1.5 to 4.2, 1.5 to 4.6, 1.5 to 4.8 and 1.5 to 5.0. A representative plot of the charge/discharge profiles for this material under different cut-off voltages is shown in FIG. 8.

Figure 8:
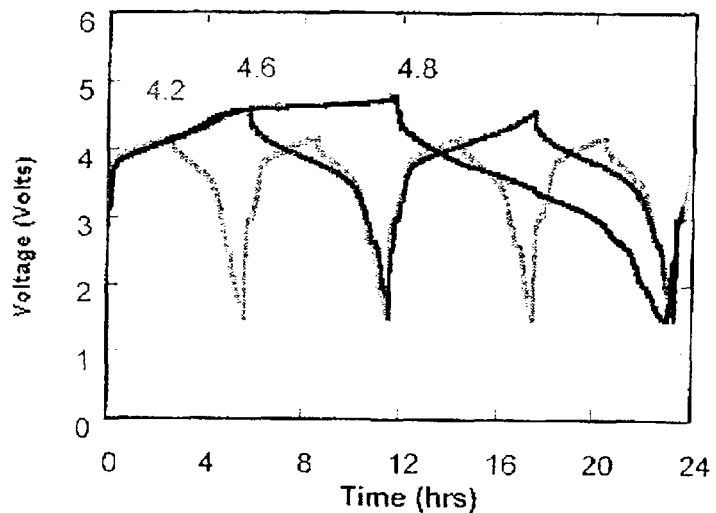
FIG. 8 is a graph showing the charge/discharge profile of a solution lithium-ion cell having $LiMn_{0.7}Ni_{0.25}Co_{0.025}AL_{0.025}O_2$ as a positive electrode-active material using cut-off voltages of 4.2, 4.6 and 4.8 volts.

As shown in FIG. 8, the manganese-rich material exhibits two charge plateaus in the first cycle. The upper voltage limit for the first plateau is about 4.6 volts. The discharge capacities are about 70 and 120 mAh/g, respectively, when cells were cycled within voltage ranges of 1.5–4.2 and 1.5–4.6 volts. However, the discharge capacity is almost doubled to about 225 mAh/g when the voltage window is widened to 4.8 volts. The flat second plateau between 4.6 to 4.8 volts is striking because it highlights the difference between the Mn-rich quaternary systems and present commercial cathode materials, such as $LiCoO_2$, $LiNiO_2$ and $LiMn_2O_4$, which are unstable under these voltage conditions. In conclusion, it was found that the Mn-rich cathode materials could be charged up to 5 volts.

Figure 9:
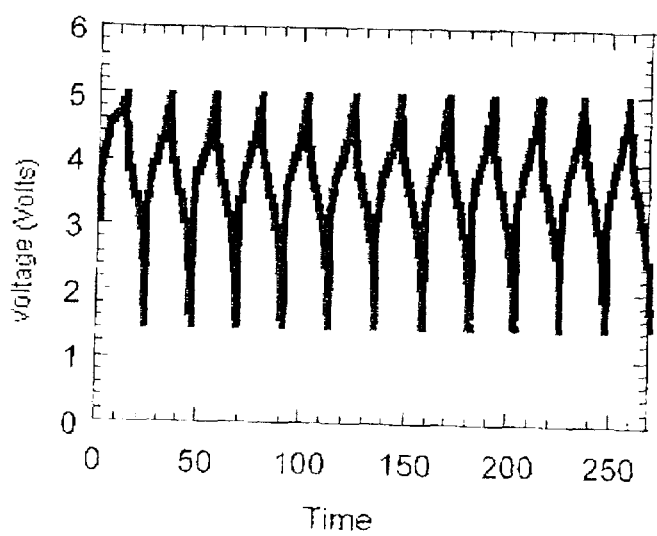
FIG. 9 is a graph showing the charge/discharge capacity of a cell having $LiMn_{0.7}Ni_{0.25}Co_{0.025}AL_{0.025}O_2$ as a positive electrode-active material in its first 12 cycles between 1.5–5 volts.

The stability of the quaternary Mn-rich was tested by cycling a test cell having a cathode produced from material that was made according to the method described in Example 7 through a number of charge/discharge cycles. FIG. 9 shows the charge and discharge capacities of the cell in its first 12 cycles between 1.5–5 volts. The initial drop of the capacity in the first cycle is about 15%, which is comparable to commercial cathode material $LiCoO_2$. However, there was no apparent capacity decay after the first cycle. Actually, discharge capacities increased slightly after the first cycle. In some testing cells, discharge capacities were found to be as high as about 260 mAh/g after the $4^{th}$ cycle.

Figure 10:
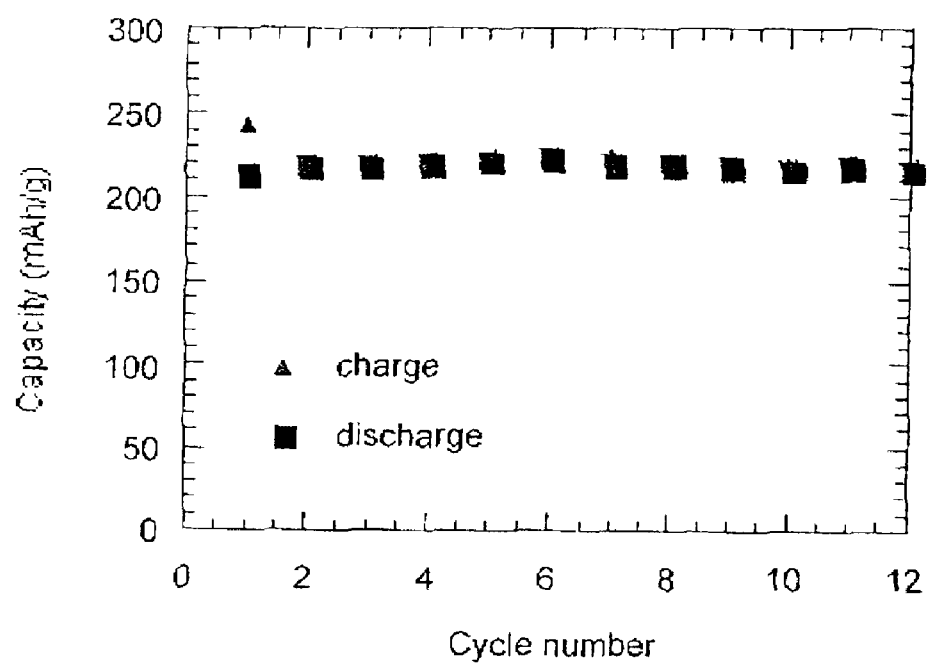
FIG. 10 is a graph showing voltage as a function of time for the first 12 charge/discharge cycles between 1.5–5 volts of a cell having $LiMn_{0.7}Ni_{0.25}Co_{0.025}AL_{0.025}O_2$ as a positive electrode-active material.

A further evaluation of charge/discharge profiles is shown in FIG. 10, which shows the voltage as a function of the cycle. In the figure, a significant difference can be seen between the first cycle and subsequent cycles. Starting from the second cycle, the second plateau that was observed between 4.6 and 4.8 volts is no longer visible, instead a smooth charge/discharge profile is seen. Without being limited to this or any other particular theory, it is believed that such a change may indicate a structural transformation of cathode material during the first cycle.

In order to determine the effect of different levels of Mn, Ni, Co, and Al in the present quaternary composite oxide materials, cathodes were produced from several different composite oxides having the compositions shown in Table 1.

TABLE 1

Composition and testing data for Mn-rich cathode materials.

| Sample No. | Composition (Mn:Ni:Co:Al) | Weight Of Active Materials (mg) | Discharge Capacity; First cycle (mAh/g) | Discharge Capacity: Fourth cycle (mAh/g) |
| --- | --- | --- | --- | --- |
| 1 | 70:25:2.5:2.5 | 27.3 | 222.6 | 254.9 |
| 2 | 70:20:5:5 | 26.1 | 228.0 | 266.0 |
| 3 | 70:10:10:10 | 27.3 | 184.5 | 234.0 |
| 4 | 70:2.5:25:2.5 | 27.9 | 115.1 | 186.2 |
| 5 | 70:5:20:5 | 27.3 | 156.6 | 216.0 |
| 6 | 70:2.5:2.5:25 | 27.3 | 40.7 | 67.1 |
| 7 | 70:5:5:20 | 29.1 | 64.3 | 93.9 |
| 8 | 80:10:5:5 | 27.9 | 156.0 | 227.8 |

As shown in Table 1, when manganese content is 70 mol percent of the combination of Mn, Ni, Co, and Al, it was seen that higher Ni content provided higher capacities. For example, when Ni content is in the range of 20–25 mol percent of the quaternary oxide, the capacity of the cell was highest.

The common feature for the Mn-rich cathode materials was their tendency to give higher capacity after the first cycle, which is believed to underscore the uniqueness of such materials. Generally, manganese-based materials have shown the opposite trend upon cycling, which has long been a key obstacle for commercial applications. Moreover, the discharge capacity of over about 200 mAh/g is rare for a manganese-based material and is believed to represent significant progress in the formulation of manganese-based cathodes suitable for commercial use.

The performance of the Mn-rich cathodes was compared with the performance of a commercial standard $LiCoO_2$ cathode under similar testing conditions. In voltage windows of 1.5–4.2, 1.5–4.6 and 1.5–4.8 volts, discharge capacities for the standard $LiCoO_2$ cathodes were found in the order of about 110, about 160, and about 170 mAh/g, respectively, in the first cycle. As expected, $LiCOO_2$ was stable in the 1.5–4.2 voltage range, but degraded rapidly at higher voltages, especially in the 1.5–4.8 volt range. For example, the discharge capacity of the $LiCoO_2$ cell was found to be about 140 mAh/g after the $3^{rd}$ cycle, which is a loss of about 30 mAh/g (or about 20%) from the value in the first cycle. The test showed that the Mn-rich quaternary composite oxides had superior stability to $LiCoO_2$ oxides at higher voltages, and also provided discharge capacities of over 200 mAh/g.

All references cited in this specification, including without limitation all papers, publications, patents, patent applications, presentations, texts, reports, manuscripts, brochures, books, internet postings, journal articles, periodicals, and the like, are hereby incorporated in their entireties into this specification by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense. These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What is claimed is:

1. A positive electrode active material comprising a composite oxide having the general formula $Li_xMn_yNi_zCo_uAl_wO_n$, where $0<x\leq2$, $2\leq n\leq4$, the sum of y+z+u+w is about 1 to 2, z, u and w are each greater than 0, and $0.7\leq y/(y+z+u+w)<1.0$.

2. The material according to claim 1, wherein the composite oxide is in a single phase.

3. The material according to claim 2, wherein the composite oxide is in a spinel structure.

4. The material according to claim 1, wherein $y/(y+z+u+w)\geq0.7$, $z/(y+z+u+w)\leq0.2$, $u/(y+z+u+w)\leq0.1$, and $w/(y+z+u+w)\leq0.1$.

5. The material according to claim 4, wherein $y/(y+z+u+w)\geq0.7$, $z/(y+z+u+w)\leq0.2$, $u/(y+z+u+w)\leq0.05$, and $w/(y+z+u+w)\leq0.05$.

6. The material according to claim 5, wherein the composite oxide has a general formula of $Li_xMn_{0.7}Ni_{0.2}Co_{0.05}Al_{0.05}O_n$.

7. A method of producing a positive electrode active material having the general formula $Li_xMn_yNi_zCo_uAl_wO_n$, comprising the steps:
(a) mixing manganese, nickel, cobalt and aluminum, in relative amount so that $0.7\leq y/(y+z+u+w)<1.0$, and z, u, and w are each greater than 0;
(b) adding a source of lithium to the mixture; and
(c) calcining the mixture of lithium, manganese, cobalt, nickel, and aluminum in the presence of oxygen to form a lithiated composite oxide material having the general formula $Li_xMn_yNi_zCo_uAl_wO_n$, where $0.7\leq y/(y+z+u+w)<1.0$, and $0<x\leq2$, and $2\leq n\leq4$.

8. The method according to claim 7, wherein step (a) comprises: mixing into solution in a liquid solvent salts of nickel, manganese, cobalt and aluminum, where $0.7\leq y/(y+z+u+w)<1.0$; and precipitating a homogeneous mixture of the four materials from the solution.

9. The method according to claim 8, wherein the liquid solvent is water and the salts are nitrates, sulfates, phosphates, or halides, and at least one of the four metal salts comprises the metal in its lowest oxidation state.

10. The method according to claim 9, wherein at least three of the four metal salts comprise the metals in their lowest oxidation state.

11. The method according to claim 10, wherein the step of precipitating a homogeneous mixture of the four materials from the solution comprises the addition of a metal hydroxide to the solution.

12. The method according to claim 11, wherein the step of removing lithium nitrates from the precipitated mixture is added between step b and step c.

13. The method according to claim 12, wherein the lithium that is added in step (b) comprises a material selected from the group consisting of $Li_2CO_3$, LiOH, $LiNO_3$, $LiPO_4$, LiF, LiCl, LiI, $LiOH.H_2O$, $Li_2SO_2$ and LiOAc.

14. The method according to claim 13, wherein the amount of lithium that is added in step c is within a range of about 0.9 to about 1.1 of the combined amounts of the nickel, manganese, cobalt and aluminum on a molar basis.

15. The method according to claim 14, wherein the lithium is added in a water solution in step (b) and, prior to calcination, the precipitated mixture is intermixed with the lithium to form a suspension;

the suspension is separated into droplets;

the droplets are frozen; and water is removed from the frozen droplets by sublimation to form a dry mixture of lithium hydroxide and the hydroxides of nickel, manganese, cobalt and aluminum.

16. The method according to claim 15, wherein the droplets are frozen by contact with liquid nitrogen.

17. The method according to claim 10, wherein the step of calcining the mixture comprises heating the mixture to a temperature of from about 550° C. to about 1200° C. for a time sufficient to convert the hydroxides to oxides.

18. The method according to claim 9, wherein following step (a), and prior to step (b), the precipitated homogeneous mixture is reacted with a source of oxygen under conditions designed to further oxidize at least a portion of the hydroxides.

19. The method according to claim 18, wherein the precipitated homogeneous mixture is contacted with a source of oxygen selected from the group consisting of air, oxygen gas, and hydroperoxides.

20. The method according to claim 19, wherein the precipitated homogeneous mixture is separated from the liquid prior to contact with a source of oxygen; and then the precipitated mixture is heated to a temperature of between about 40° C. and about 120° C. in the presence of air for a period sufficient for at least some of the hydroxides to react to form oxides.

21. The method according to claim 20 wherein the material that has been contacted with oxygen is then mixed in step c with an amount of lithium that is within a range of about 0.9 to about 1.1 of the combined amounts of the nickel, manganese, cobalt and aluminum on a molar basis.

22. An electrochemical cell produced by the method of claim 7.

23. An electrochemical cell produced by the method of claim 8.

24. An electrochemical cell comprising a positive electrode, a negative electrode and an electrolyte which electrochemically interconnects the positive electrode and the negative electrode, wherein the positive electrode comprises a composite oxide having the general formula $Li_xMn_yNi_zCo_uAl_wO_n$, wherein $0.7 \leq y/(y+z+u+w) < 1.0$, and where $0 < x \leq 2$, the sum of $y+z+u+w$ is about 1 to 2, and $2 \leq n \leq 4$.

25. The electrochemical cell according to claim 24, wherein $y/(y+z+u+w) \geq 0.7$, $z/(y+z+u+w) \leq 0.2$, $u/(y+z+u+w) \leq 0.1$, and $w/(y+z+u+w) \leq 0.1$.

26. The electrochemical cell according to claim 25, wherein $y/(y+z+u+w) \geq 0.7$, $z/(y+z+u+w) \leq 0.2$, $u/(y+z+u+w) \leq 0.05$, and $w/(y+z+u+w) \leq 0.05$.

27. The electrochemical cell according to claim 26, wherein the composite oxide has a general formula of $Li_xMn_{0.7}Ni_{0.2}Co_{0.05}Al_{0.05}O_n$.

28. The electrochemical cell according to claim 24, wherein when the cell is subjected to at least ten charge/discharge cycles, the ratio of the discharge capacity of the cell on the tenth charge/discharge cycle relative to the discharge capacity of the cell on the first charge/discharge cycle is at least 0.75.

29. The electrochemical cell according to claim 28, wherein the ratio of the discharge capacity of the cell on the tenth charge/discharge cycle relative to the discharge capacity of the cell on the first charge/discharge cycle is at least 0.9.

30. The electrochemical cell according to claim 29, wherein the ratio of the discharge capacity of the cell on the tenth charge/discharge cycle relative to the discharge capacity of the cell on the first charge/discharge cycle is at least 0.9, where the cell is charged to over 4.8 volts on each cycle.

31. The electrochemical cell according to claim 24, wherein the discharge capacity on the fourth cycle is at least about 200 mAh/g.

32. A lithium-ion battery comprising a sealable cell container, a positive electrode, a negative electrode, an electrolyte solution, a separator, a positive electrode current collector, and a negative electrode current collector, where the positive electrode comprises a composite oxide having the general formula $Li_xMn_yNi_zCo_uAl_wO_n$, where $0 < x \leq 2$, the sum of $y+z+u+w$ is about 1 to 2, and $2 \leq n \leq 4$, and $0.7 \leq y/(y+z+u+w) < 1.0$.

33. The battery according to claim 32, wherein the composite oxide is in a single phase.

34. The battery according to claim 33, wherein the sealable cell container, the positive electrode, the negative electrode, and the separator comprise flexible polymeric materials.

* * * * *